(12) United States Patent
Bryan et al.

(10) Patent No.: US 7,136,177 B1
(45) Date of Patent: Nov. 14, 2006

(54) MULTI-SOURCED EXTENSIBLE PUBLISHING AND EDITORIAL SYSTEM AND RELATED METHODS

(75) Inventors: Shane A. Bryan, Corvallis, OR (US); Kenneth H. Bronstein, Corvallis, OR (US); Aloke Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 993 days.

(21) Appl. No.: 09/762,542

(22) PCT Filed: Jun. 1, 2000

(86) PCT No.: PCT/US00/15126

§ 371 (c)(1),
(2), (4) Date: Apr. 7, 2001

(87) PCT Pub. No.: WO00/75798

PCT Pub. Date: Dec. 14, 2000

Related U.S. Application Data

(63) Continuation-in-part of application No. 09/325,040, filed on Jun. 7, 1999, now Pat. No. 7,065,497.

(51) Int. Cl.
 *G06F 3/12* (2006.01)

(52) U.S. Cl. .................................. 358/1.15; 358/1.18

(58) Field of Classification Search .............. 358/1.15, 358/1.18, 1.5, 1.11, 1.13, 1.14; 709/3, 10, 709/26, 27, 514, 515, 526, 527; 399/8, 9; 705/14

See application file for complete search history.

(56) References Cited

U.S. PATENT DOCUMENTS

| | | | | |
|---|---|---|---|---|
| 5,717,974 | A | * | 2/1998 | Park ............................ 399/24 |
| 5,835,923 | A | * | 11/1998 | Shibata et al. .............. 715/526 |
| 5,860,073 | A | * | 1/1999 | Ferrel et al. ................ 715/522 |
| 5,872,638 | A | | 2/1999 | Haze |
| 5,907,837 | A | | 5/1999 | Ferrel et al. .................... 707/3 |
| 6,018,338 | A | | 1/2000 | Greulich et al. ............ 345/333 |
| 6,038,601 | A | | 3/2000 | Lambert et al. ............ 709/226 |
| 6,044,205 | A | | 3/2000 | Reed et al. ............ 395/200.31 |
| 6,332,146 | B1 | * | 12/2001 | Jebens et al. ............ 707/104.1 |
| 6,385,592 | B1 | * | 5/2002 | Angles et al. ................ 705/14 |
| 6,772,396 | B1 | * | 8/2004 | Cronin et al. ............... 715/523 |

FOREIGN PATENT DOCUMENTS

| | | |
|---|---|---|
| JP | 10215376 | 8/1998 |
| WO | WO99/63452 | 12/1999 |

\* cited by examiner

*Primary Examiner*—Dov Popovici

(57) ABSTRACT

A method for receiving information at a document delivery server from a producer to generate and/or update a publication profile, periodically acquiring content objects from one or more content providers based, at least in part, on the publication profile, and generating the publication utilizing one or more of the retrieved content objects. According to one implementation, the generated publication is a mock-up, which is presented to the producer to review and/or edit prior to final publication.

28 Claims, 26 Drawing Sheets

| TITLE OF DELIVERY | DELIVERY SCHEDULE | TEXT DELIVERY DATE | DELIVERY SCHEDULE |
|---|---|---|---|
| TIME.COM AFTERNOON UPDATE | AT 2:30pm WEEKDAYS | FRI. MAY 28 1999, AT 2:30pm | PRINTED THU. MAY 27 1999, AT 2:40pm — 11000 |
| FILE: DAILYCALENDAR.DOC | AT 7:00am WEEKDAYS | FRI. MAY 28 1999, AT 7:00am | PRINTED THU. MAY 27 1999, AT 7:10am — 12000 |
| MY PERSONALIZED NEWSLETTER | AT 1:30pm WEEKDAYS | FRI. MAY 28 1999, AT 1:30pm | PRINTED THU. MAY 27 1999, AT 1:33pm — 13000 |
| HP INSTANT DELIVERY TIMES | AT 5:00am MONTHLY ON THE FIRST MONDAY... | MON. JUN 7 1999, AT 5:00am | NONE (NEW ITEM) — 14000 |
| BELOIT DAILY NEWS HOME PAGE | AT 8:00pm EVERY 2 DAYS | THU. MAY 27 1999, AT 8:00pm | PRINTED TUE. MAY 25 1999, AT 8:00pm — 15000 |

TIME.com afternoon update

FRIDAY May 7, 1999

INTERNATIONAL    TIMEdaily

ALL RIDING ON MOSCOW

11000

The spin in Washington: Moscow has "finally" agreed to Western demands for a peacekeeping force in Kosovo, leaving Milosevic isolated. The spin in Moscow: Russia has always accepted a peacekeeping force in Kosovo, and Washington has finally signed on to a peace plan the Kremlin has been pushing for weeks. The spin in Belgrade: Milosevic is ready to talk about a U.N. presence in Kosovo, but not before NATO halts its bombing – a position backed by Moscow. NATO remains committed to bombing until its demands are met, and pounded targets in Yugoslav cities overnight.

Peace now depends on finding a formula by which the Serbs can make sufficient concessions to persuade NATO to ground its bombers. "NATO's not going to easily suspend the bombing because it knows it may be politically unable to restart it," says TIME Pentagon correspondent Mark Thompson. "The alliance may even intensify the bombing in the hope of making Milosevic more compliant." It will be left to Moscow, once again, to choreograph a sequence of symmetrical Serb withdrawal and NATO bombing suspension. Russian envoy Viktor Chernomyrdin heads for Washington Sunday and plans to visit Belgrade shortly. The tracks toward a peace deal have now been laid.

For more visit http://www.time.com/daily money.com

CURRENT INDEXES
FRI MAY 7 16:45 EDT

| DJIA | 11011.50 | 84.70 |
| NASDAQ | 2503.62 | 30.83 |
| S&P 500 | 1345.00 | 2.31 |
| NYSE | 641.24 | 0.70 |
| AMEX | 787.29 | 1.80 | money.com
GM LOSES SUIT

A Texas jury ruled General Motors must pay $47.5 million to the family of a man whose neck was broken because his pickup truck did not have head restraints. But the family offered to forgo the $31 million in punitive damages if GM would recall all trucks made without head restraints.

People
NO THIRD GUNMAN

Authorities on Thursday appeared close to ruling out the possibility of a third gunman in the Columbine High School massacre. "At this point we are still exploring the possibility of a third shooter. But we do not have a suspect in mind, and none of the physical evidence points definitely to a third person," said a Jefferson County Sheriff's spokeswoman.

ENTERTAINMENT    ENTERTAINMENT WEEKLY

PARTY POLITICS

Vice President Al Gore stepped down as guest-host for Larry King's show last night when Republicans joined forces to complain that it was unfair to give him all of that free airtime this close to the 2000 election. Gore was to lead a discussion on the Littleton, Colorado, shootings; instead he just sat in as a guest for the King-moderated program. Although Gore gave up the mike voluntarily, his spokesman said it was unfortunate that Republicans had to "inject partisan politics" into coverage of the Columbine disaster.

For more visit http://www.ew.com

FIG.9A

Entertainment WEEKLY

NEESON CALLS IT QUITS

Screen star Liam Neeson ("Schindler's List") has shocked the movie industry. The Irish-born actor told reporters in New York that he will never make another film and is quitting Hollywood in disgust after being treated like a "puppet."

TIMEdaily

WINNER AND LOSER OF THE DAY

Winner:
Keiko: The former star of the movie "Free Willy" is being trained to survive on his own. In preparation for the killer whale's exit from his watery Icelandic pen, Keiko is being weened of human affection. Hopes are high that this treatment of tough love may enable the whale to live on his own by the end of the year.

Loser:
Bison: A federal appeals court has announced that bison leaving Yellowstone National Park in search of winter forage may be killed. Over the past three years more than 1,200 bison have met such a fate in an effort to protect Montana's cattle from being infected with a livestock disease.

BALKANS UPDATE TIMEdaily

REFUGEES FACE LONG WAIT

Kosovo's refugees are unlikely to be home by Christmas, or even by Ramadaan (which most of them celebrate). Even if all sides agree quickly to a peace deal, the logistics of reversing the Serbs' "ethnic cleansing" are mammoth. President Clinton met ethnic Albanian refugees in Germany Thursday and vowed to guarantee their return. But the very fact of those refugees' being in Germany — and in New Jersey — underscores the effectiveness of Milosevic's depopulation of the region. So even as President Clinton promised that the refugees would "go home in peace and freedom," U.N. humanitarian officials coordinating relief efforts urged Western leaders to support the refugees in Macedonia and Albania through a bitter Balkan winter.

"Many other problems remain to be solved before the refugees can return," says TIME Central Europe reporter Dejan Anastasijevic. Redeploying the 40,000 Serb troops from the ravaged province will take some time, as will the assembly and deployment of an international force. Rebuilding infrastructure damaged by the war to allow for the orderly movement of some 600,000 refugees back to their villages will take many months. But most will return as soon as possible. "The refugees are mostly rural people," says Anastasijevic. "They're far too attached to their land to consider settling anywhere else."
For more visit http://www.time.com/daily

TECH NEWS TIMEdigital

NEW STANDARD FOR MUSIC ONLINE

Like it or not, the Net looks like the record store of the future. But how can record companies prevent downloading copyrighted music in digital form, without paying for it? Universal Records is inventing its own, brand-new digital format, one that will resist copying and that will require users to pay to download it. Universal announced Wednesday that it would try to have the new pay-for-play standard up and running by Christmas. The Recording Industry Association of America, which represents a number of big-time labels, is trying to promote its own standard under the name SDMI; apparently, Universal got tired of waiting for SDMI to materialize, so it decided to set a somewhat brisker pace.
For more visit http://www.timedigital.com VISIT US AT http://www.pathfinder.com

Science/Health

Pluto Is Again Most Distant Planet

By The Associated Press

WASHINGTON (AP) -- Tiny Pluto slips outside the orbit of Neptune today to resume its role as the farthest planet from the sun.

This return to normal comes just days after the littlest planet survived an attack that threatened to strip it of its planetary status altogether.

Normally the most distant planet, Pluto has an unusual orbit that takes 248 Earth-years to complete one trip around the sun. During just 20 of those years, it moves inside Neptune's orbit to become the eighth planet instead of the ninth.

Pluto moved inside Neptune's orbit on Feb. 7, 1979, and was on course to cross back outside at 5:08 a.m. EST today, scientists at the National Aeronautics and Space Administration calculated.

Pluto will remain the most distant planet for the next 228 years.

Just last week, the Paris-based International Astronomical Union, the world's leading astronomical organization, reaffirmed Pluto's standing as the smallest planet.

News reports had said Pluto might be demoted to a minor planet, or -- worse -- a trans-Neptunian object.

"No proposal to change the status of Pluto as the ninth planet in the solar system has been made by any division, commission or working group of the IAU responsible for solar system science," said the 80-year-old organization, the final authority on astronomical matters.

Even though Pluto was crossing Neptune's orbit, there was no worry about a collision. NASA said, because the planets were going to be far apart at the time.

Pluto was discovered Feb. 18, 1930, by Clyde Tombaugh at Lowell Observatory in Flagstaff, Ariz. Its moon, Charon, was found in 1979.

With a diameter of 1,430 miles, Pluto is less than half the size of any other planet and only two-thirds as big as Earth's moon. ✦

Childbirth: Fertility Clinics' Boom in Babies

By THE ASSOCIATED PRESS

The Centers for Disease Control and Prevention reports that fertility-enhanced births nationwide jumped 25 percent in a year but cautions that the sharp increase may be due to better reporting, not necessarily a rise in the number of women seeking help from fertility clinics.

"It's premature to draw too many conclusions about a trend between last year and this year," Dr. Lynne Wilcox, director of the centers' Division of Reproductive Health, said last week.

In the survey, 300 fertility clinics reported that their clients had 14,388 live deliveries from pregnancies that began in 1996. That was up from 11,516 reported the year before by 281 clinics.

The data were included in the centers' annual consumer guide to fertility clinic success rates. It was only the second time the agency had released such a report, which was required by Congress.

The report does not rank or grade the clinics because some specialize in more difficult fertility cases and have naturally lower success rates. But it includes other data like the "take-home baby rate," the multiple-birth rate and the number of embryos each clinic uses. About 38 percent of the deliveries reported in this year's guide were multiple births, up from 37 percent the year before. ✦

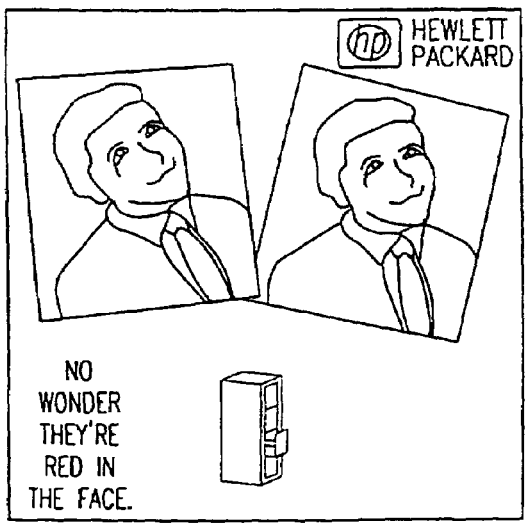

---

IN BRIEF

Study Links Scars to Breast Cancer

By THE ASSOCIATED PRESS (February 11) A microscopic change in breast tissue can help doctors predict whether a woman whose biopsy is benign may develop cancer, researchers reported today in the New England Journal of Medicine. ✦

Anti-Cancer Drug To Be Tested

By THE ASSOCIATED PRESS (February 11) Government scientists have finally been able to reproduce a scientist's highly publicized results for an anti-cancer drug and are now seeking to begin the first human tests. The Boston Globe reported today. ✦

FIG.11B

TECHNOLOGY
MORE STATES CONSIDER LAWS RESTRICTING JUNK E-MAIL

By JERI CLAUSING

As lawmakers around the country discover that their constituents are concerned about Internet issues, bills to regulate or outlaw junk e-mail are popping up in state legislatures. Three laws restricting junk e-mail are already on the books, and lawmakers are considering four more.

Advocates of the laws say they are encouraged by the new interest state lawmakers are taking in protecting consumers and Internet service providers from the scourge of junk e-mail, dubbed "spam" by annoyed recipients. However, they are also concerned that a patchwork of different laws across the country could hamper legitimate online marketing.

"We would prefer a single good federal law, but if we can't find a federal solution we're going to have to work state by state," said John Mozena, a board member of the Coalition Against Unsolicited Commercial E-Mail (CAUCE).

"The problem is, that would also make it much harder for people playing by the rules, and we don't want to make it difficult for people to do authentic business online," Mozena said. "We just want them to be paying their own freight. But we will take 50 state laws, so be it, if we can't get a federal law."

Legislators adjourning for their 1999 sessions have introduced proposed spam laws in Texas, Virginia, Washington and Maryland. More are expected before lawmakers in other states wrap up this year's business.

In the last Congress, CAUCE had been pushing for federal legislation to amend an existing junk fax law to also outlaw unsolicited junk e-mail. That bill, which was sponsored by Representative Chris Smith, a New Jersey Republican, made little headway. Instead, the Senate passed a proposal by Senators Robert Torricelli, a New Jersey Democrat, and Frank Murkowski, an Alaska Republican, that would have regulated junk e-mail by requiring that it be labeled as advertising and that senders provide an easy way for recipients to get off their mailing lists. Although that bill never made it through the House, the senators are expected to introduce a new version this year.

The Murkowski-Torricelli bill has been favored by the Direct Marketing Association (DMA). But groups like CAUCE say it still fails to address the issue of cost. Internet service providers pay for the cost of processing millions of pieces of junk e-mail, and some Internet users must pay their ISP or phone company for the time they spend downloading spam.

In a surprise announcement in December, CAUCE and the DMA said they had reached a tentative agreement on principles for new federal legislation. But Mozena said in a telephone interview last week that his optimism about finalizing that agreement was waning.

For now, he said, CAUCE is working with state lawmakers around the country, trying to add to the list of three states that already have laws restricting junk e-mail. He said the

CONTINUED ON PAGE 9

IN BRIEF

COURT UPHOLDS INTERNET OFFICE BAN
By THE ASSOCIATED PRESS

A federal appeals court has upheld a Virginia law that prohibits state employees from looking at sexually explicit material via the Internet while at work. ♦

NATIONAL SECURITY AND THE NET
By JERI CLAUSING

In a preview of what promises to be increasing clashes between national security interests and the Internet, House Commerce Committee members began debating whether or not Congress should limit the posting online of unclassified but sensitive information about potential disasters at the nation's chemical plants. ♦

Shareholders Sell E*Trade
By DAVID CAY JOHNSTON

Several major investors in the E*Trade Group, the online brokerage firm whose trading system was down for several hours on three days last week, sold big chunks of stock last week just before the outages. ♦

SUN IN DEAL WITH AOL
By BLOOMBERG NEWS

Sun, one of the biggest makers of computers that run Internet sites, will pay AOL a minimum of about $1.28 billion over three years as part of their agreement to sell Netscape software. ♦

FIG.11C

ESSAY/BY WILLIAM SAFIRE
LET THE PERP WALK

Washington -- The System worked. What a great country.

Remember, only a couple of months ago, all those dire warnings out of the White House about the "national paralysis" that impeachment by the House of Representatives would bring? A parade of sleazy witnesses and a flood of pornographic evidence would, the Clintonites threatened, tie the Senate in knots throughout 1999. Furious partisanship would surely rip apart the political fabric.

That did not happen. The House ignored the threats and went ahead with the first impeachment of an elected President. The Senate majority leader made good on his prediction that the trial would take weeks, not months. And while the voices of a prosperous people murmuring "don't make waves" were listened to, the historic point was also made that the abuse of executive power in America has its consequences.

Were it not for the impeachment process, the notion that the Clinton scandals were "just about sex" would have prevailed. The President's behavior would have been tut-tutted at, but the focus would have been on bluenosed intrusion into private sin rather than the use of the power of the Presidency to defeat a civil rights lawsuit and impede a Federal grand jury.

That triumph of spin did not happen either. What did happen? In light of the voters' decision last November that punishment for high crimes was unwanted, the most that proponents of equal justice under law could hope for was public understanding of the damage Bill Clinton had done.

However the vote goes this week, the connect-the-dots presentation by the managers to the Senate persuaded most Americans paying attention that the President has (1) directed a campaign of lies and would still be lying were it not for the blue dress; (2) disregarded the privacy rights of those who dared to call him to account, and (3) delivered a heavy blow to the sanctity of the oath in courts of law.

Removal of a President in the absence of public outrage would be a Draconian mistake. Impeachment was an ineradicable mark on his record; the Senate trial was public purgatory. That's a powerful warning to future Presidents contemplating obstruction. The principled majority of senators can vote to remove Clinton confident that a nullifying minority will make their condemnation purely symbolic.

Censure afterward? That would assuage the consciences of many who feel guilty about casting a vote that effectively condones the abuses of power. But that grand straddle would engrave over the portals to the Senate the initials "C.Y.A."

In such extraconstitutional punishment-by-exhortation, reputation, not retribution, is paramount: to its compromising proponents, it matters not if you convict or acquit, but how you blacken the name.

No, impeachment and its brief but educational trial will do. Senators worried about history or the next election can justify their acquittal votes with speeches in a final chapter to the official document titled "Not Guilty With an Explanation."

Clinton and his allies, in reacting to acquittal, will not be so foolish as to repeat the pep rally after the House impeachment. No champagne corks will publicly pop; sobriety with a pinch of contrition will be the message of the day. But the spin machine, by its nature, cannot stop itself from pumping out "much ado about nothing; purely partisan; all about sex."

Moreover, its Justice appointees (fresh from a cover-up of the Asian connection) will seek to get even with Ken Starr, even as its Carvilles will try to purge those Republicans who dared to speak truth to the power-abusive. That's making a move on "moving on."

We who keep hope alive that more of the story will be forced out can count on that knee-jerk, war-room reaction of the most vindictive Clintonites.

Starr's non-Monica reports may be mired in molasses, but likely to come are memoirs of disillusioned aides, toots from whistleblowers and straight reporting about an unraveling Administration (and its I.R.S.). These sources may open some of the hatches that Ruff, Lindsey & Co. has so fiercely battened down.

That's why we can take heart at how The System Worked.

We underestimated the House and it did itself proud. We trusted the Senate and it went by the constitutional book. Thus can the nation say, with Vernon Jordan, "Mission accomplished." ♦

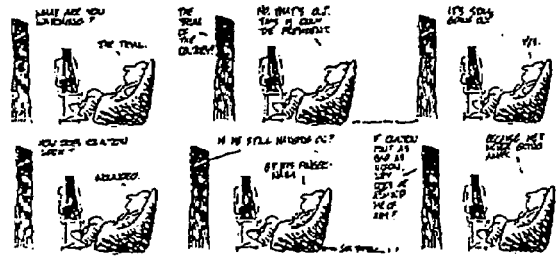

FIG.11D

HP INSTANT DELIVERY TIMES
*SHORTCUTS, SOLUTIONS AND MORE*

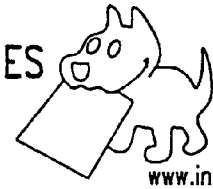

MAY 1999 www.instant-delivery.com

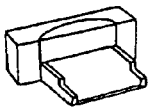

HP INSTANT DELIVERY-
DESIGNED FOR HP PRINTER

ALL BRAND AND PRODUCT NAMES
ARE TRADEMARKS OR REGISTERED
TRADEMARKS OF THEIR RESPECTIVE
COMPANIES

The HP Instant Delivery newsletter has a new name! You'll get the same great helpful tips, just a slightly different name.

Beginning in June, HP Instant Delivery Times will be issued monthly. Make sure you update your subscription to the first Monday of every month!

New Version!
A new version of Instant Delivery will be available on May 8. HP Instant Delivery will automatically notify you when the new version is ready or you can go to the web site to download it. Here are some highlights of the new version:
• You can set up HP Instant Delivery to print your deliveries only when they have changed. This new feature allows you to print documents that are updated at irregular intervals. HP Instant Delivery will check as often as you like, but will only print when the content has been updated. There may be cases when pages that have not changed do print. Check Help to learn more.
• HP Instant Delivery works even harder to print your deliveries.

HP Instant Delivery Publisher Updates
Like baseball? CBS SportsLine features Major League Baseball. Go to the Featured Publishers page and click on Major League Baseball News to add daily delivery of the latest baseball action.

Get in touch with hometown news! From the Featured Publishers page click on Your Local News to sign up for your local newspaper. If your local paper is not listed, use the Feedback from the navigation bar to send us a message and we will try to add it.

We've added 25 more publications to the Catalog of Publications section of our web site. Keep checking our site, as we will always be adding more.

New look!
Starting in June our site will have a new look! Coming soon you can preview the site at beta.instant-delivery.com. Send Feedback to let us know what you think.

| User_name | User_ID | Contact_info | Interest_info | Subscription_info | Disposition_info | Feedback_info |
|---|---|---|---|---|---|---|
| Gerry Smith | 223157 | Home Info Office Info Payment Info | NFL Coverage NY Politics ... | Sports Illustrated New York Times ... | Dwnld Print Read Online ... | ... Forwards Sports ... |
| Johnny W. Doe | 223151 | ... | ... | ... | ... | ... |

Fig. 16B

| Content_prvdr | Prvdr_ID | Wrapper_ID | Rate_schedule | Monthly_usage | Feedback_info |
|---|---|---|---|---|---|
| Sports Illustrated | 221 | 132 133 134 | .02 .04 .04 | 10000 1500000 1980000 | Feedback_Info |
| NY Times | 223 | 310 311 312 | .03 .05 .05 | 50000 2250000 2490000 | Feedback_info |

| Publication Name | Prod_ID | Contact_info | Interest_info | Source_info | Associated_Adv | Sched |
|---|---|---|---|---|---|---|
| Your Regional Basketball Report | 223157 | eMail address | Big 10 ACC ... | Chicago Tribune Atlantic Times ... | United Center NFL Panthers ... | Dly |

Personal Publishing Tools

| | | | |
|---|---|---|---|
| Producer's Name | John Doe | Password: | ****** |
| Publication Title | "Your Regional College Basketball Report" | Delivery: | Daily/Morning ▼ |
| Topic/Genre: | Sports/College Basketball ▼ | Scope: | Regional/Big 10 ▼ |
| Content Provider(s): | Chicago Tribune ▼ | ←(choose as many as apply) | |
| Layout Template: | Multi-column; Color Photos* ▼ | * Publication fees may apply | |
| Advertising Provider(s): | NONE* ▼ | * Publication fees may apply | |
| Pre-approve Publication: | Y ▼ | | |
| eMail Address: | jdoe@basketballnut.com | | |

Limitation on Liability: Producer hereby agrees abide by the terms and conditions for use set forth in the user agreement attached hereto; to waive any and all claims against Personal Publishing Tools, Corp.; and to fully indemnify Personal Publishing Tools, Corp. for all suits arising out of publication of "Your Regional College Basketball Report".

AGREE: ✓    DISAGREE (cancel): ☐

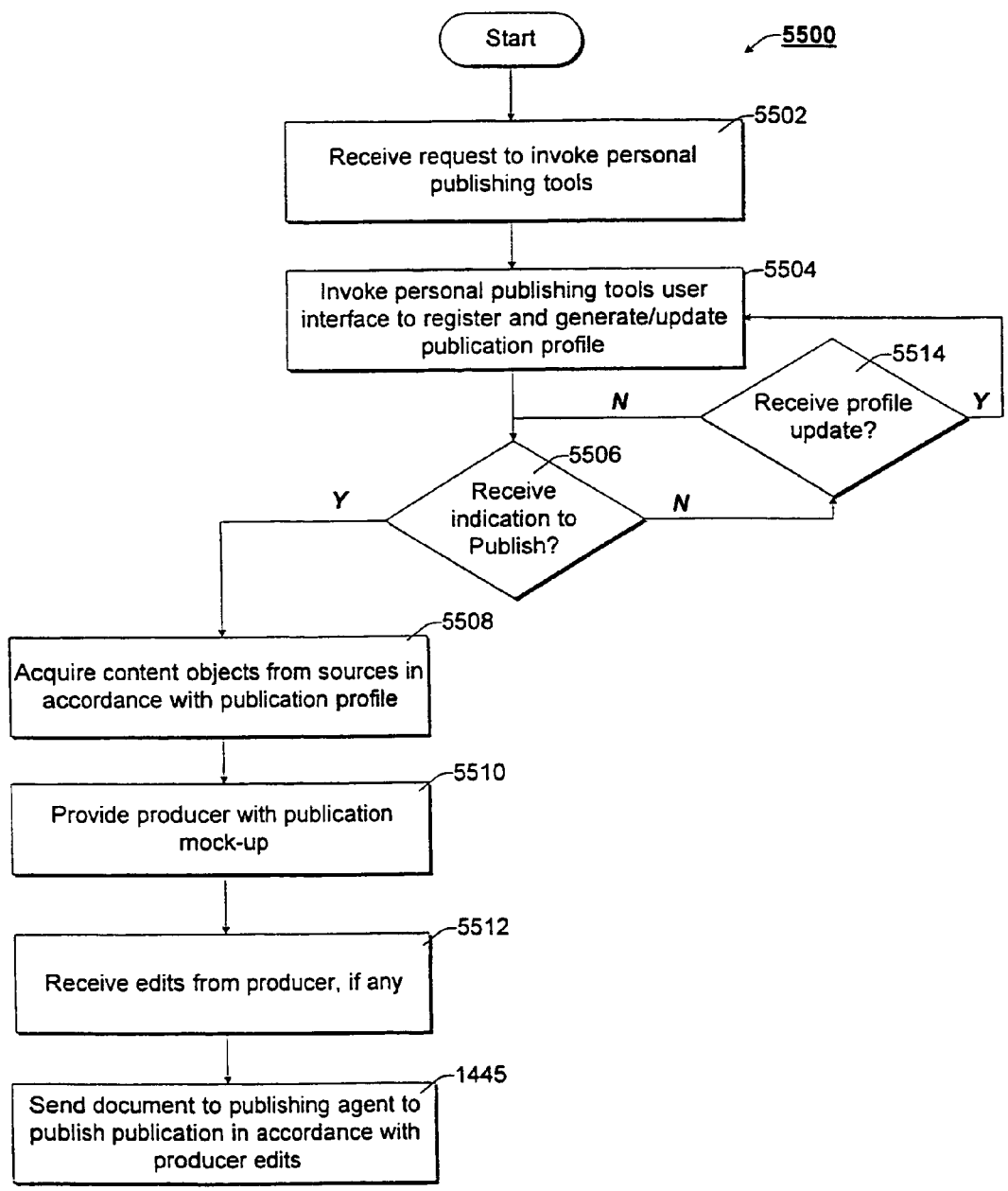

MULTI-SOURCED EXTENSIBLE PUBLISHING AND EDITORIAL SYSTEM AND RELATED METHODS

RELATED INVENTIONS

The present invention is a continuation-in-part of U.S. application Ser. No. 09/325,040 filed on Jun. 7, 1999 entitled Document Delivery System for Automatically Printing a Document on a Printing Device, by Brewster, et al Now, U.S. Pat. No. 7,065,497, issued on Jun. 20, 2006.

TECHNICAL FIELD

This invention generally relates to the printing field and, more particularly, to a multi-sourced extensible publishing and editorial system and related methods.

BACKGROUND

In the mid-1400's, Johann Gutenberg revolutionized how information is disseminated through his invention of the movable type press. With the publication of the Mazarin Bible, documents which were once held in the exclusive domain of a chosen few were now widely available to the masses. Nearly 550 years later, the mass media revolution that Gutenberg started is alive and well, complete with newspapers such as the New York Times and the Washington Post, magazines such as Newsweek and Sports Illustrated, and literally thousands upon thousands of other publications.

While these thousands of publications cover a wide range of interests, from news to sports to fashion to model rocketry, they have one thing in common: they are intended to be read by a mass market. Unlike the pre-Gutenberg days, where a document would literally be read by only one person of a very small number of people, it is not economically viable for today's publications to have such a small readership, due at least in part to high marketing, production and distribution costs. In fact, many of today's publications are funded to a very large extent by the advertising contained within them. These advertisers are attracted to publications that can consistently deliver a large, reliable audience of consumers that will be exposed to their advertising.

While this mass-market publication model has worked well for hundreds of years, it is not without its problems. One such problem is that a typical reader of a publication has a wide variety of interests, and no single mass market publication will be able to satisfy all of these interests. For example, a reader who is interested in international news, golf, fly-fishing, Genealogy, and computers may have to subscribe to several different publications to satisfy these interests. Of course, since these publications are intended for the mass market, they will also contain a significant amount of material that our reader is not interested in and will not read. It goes without saying that if there is a significant amount of material a read isn't reading, there is a significant amount of advertising that the reader isn't reading either—as well as a significant amount of paper that is wasted. Advertisers know this, and agree to pay considerably less to a mass market magazine or newspaper per 1000 exposures to their ad than they would pay to a direct-mail generator that can provide a more specific guarantee that the people exposed to their ad are of a demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reduced readership level of the publications our typical reader chooses not to subscribe to, even though she might be interested in at least some of the editorial and advertising content contained inside, means that the publication receives less subscription and advertising revenue than they otherwise would. If many other readers make the same decision, the continued health of the publication may be in jeopardy, and the publication may be forced out of business. In fact, many publications do go out of business yearly for failing to attract a sustaining number of advertisers and readers—even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged: the electronic publication. Readers of these publications typically sign into the Internet through their computer, and read the publications online. Some of these publications, such as CNN.com and pointcast.com, allow users to state personal preference on what type of material they would like to read. Often, these personalized publications include advertising, usually in the form of a banner ad that is placed on along a periphery of the visual display (top, bottom, side, etc.).

While these electronic publications have been an interesting development in the distribution of information, they still represent only a tiny fraction of the information that is published under the more traditional post-Gutenberg model. Many readers of these electronic publications complain that they are very difficult to read (on the video display), especially for long periods of time. While it might be convenient for a reader to sign onto the Internet to look at the CNN.com web site for a brief summary of late breaking news, this reader would most likely only spend a few minutes at the site, and would likely still subscribe to the more traditional print media such as Newsweek or the Washington Post. They would also likely spend significantly more time reading the more traditional printed publication than they would spend reading the electronic publication, and correspondingly, spend more time being exposed to the ads in the traditional printed publication. Accordingly, printed publications continue to flourish today—more than five centuries after Gutenberg made them possible—and after more than a decade after the innovation of the electronic publication.

Thus, while these publications have certainly benefited modern society, no significant attempt has been made thus far to solve the underlying problems with these publications discussed above. Just such a solution is provided herein.

SUMMARY

In accordance with the teachings of the present invention, various aspects of an innovative document delivery system is presented incorporating the teachings of the present invention. According to one aspect of the invention, a set of publishing tools are presented which enable a producer to utilize automated features of a document delivery system to automatically assemble content and produce publications. According to one embodiment of this first aspect, a method for producing a publication is presented comprising receiving information from a producer to generate and/or update a publication profile, periodically acquiring content objects from one or more content providers based, at least in part, on the publication profile, and generating the publication utilizing one or more of the retrieved content objects. According to one embodiment, the method is implemented by a document delivery server, however alternate embodiments are envisioned wherein the publication profile is generated and maintained on an independent server that merely utilizes the resources of the document delivery server to construct and publish the publication.

BRIEF DESCRIPTION OF THE DRAWINGS

FIG. 5 illustrates how user profile information is acquired from a user in one embodiment of the invention;

FIG. 6 shows how user profile information is acquired from a user in one embodiment of the invention;

FIG. 7 shows a print schedule for the delivery of documents in one embodiment of the invention.

FIGS. 9A–9B shows a document printed by the printing device according to one embodiment of the invention;

FIG. 10 shows a document printed by the printing device according to one embodiment of the invention;

FIGS. 11A–11D show a document printed by the printing device according to one embodiment of the invention;

FIG. 12 shows a document printed by the printing device according to one embodiment of the invention;

FIGS. 16A, 16B and 16C graphically illustrate data structures for maintaining user profile information, content provider information, and publication profile information, respectively;

FIG. 22 illustrates a flow chart of an example method for producing a publication using a publication profile, in accordance with one aspect of the invention;

FIG. 23 graphically represents an example graphical user interface (UI) enabling a producer to register and generate a publication profile, in accordance with one aspect of the present invention.

DETAILED DESCRIPTION

Figure 1:
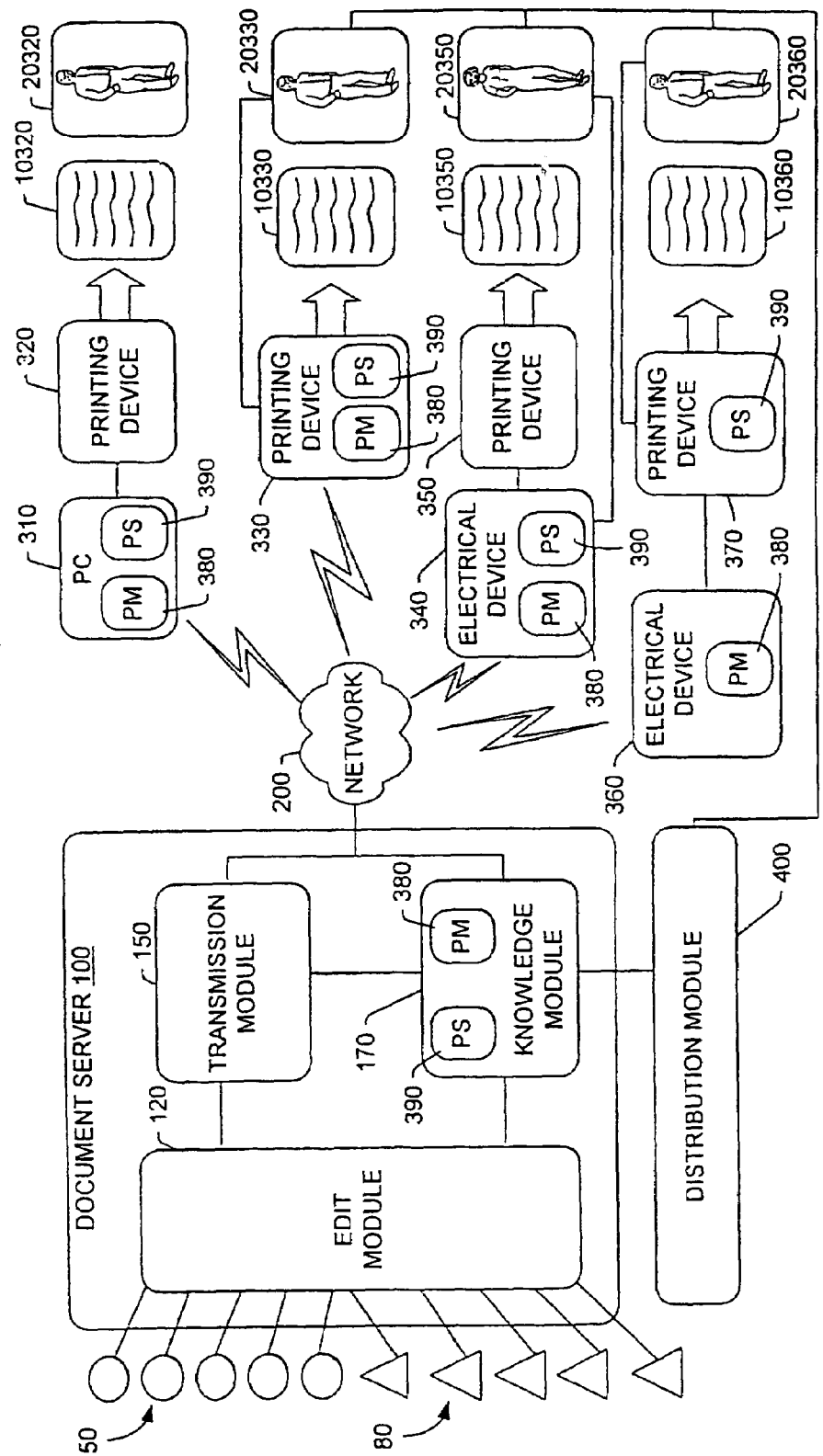
FIG. 1 shows a block diagram of a document delivery system of one embodiment of the invention.

FIG. 1 illustrates a block diagram of an innovative document delivery system, according to one embodiment of the invention. Document delivery system 10 contains document server 100. In a preferred embodiment, document server 100 is operatively coupled via network 200 to a variety of personal computers, printing devices, and other electronic devices, collectively referred to devices 300. As will be described more fully below, document server 100 contains edit module 120 with innovative publishing tools 512, transmission module 150 and knowledge module 170 to dynamically generate personalized publications from otherwise disparate content objects in accordance with a publication profile created by producers of the publications utilizing the innovative publishing tools.

As used herein, content providers 50 are intended to include all providers of publication content non-inclusive of advertising, while advertising providers 80 provide advertising material. From a financial business model, these two sources of publication material differ significantly (i.e., content providers 50 are paid a royalty from the operator of the document server, while advertisers 80 pay to advertise in the generated publications). From the standpoint of the end-user, however, they both provide content to the publication. Consequently, when used without a reference numeral the general term "content providers" is intended to include both content providers 50 and advertising providers 80. If a distinction is intended, the appropriate reference numeral will be specifically denoted to further specify the source of content.

Edit module 120 receives content object input from one or more content providers 50, and/or one or more advertising providers 80 to generate personalized documents based, at least in part, on a number of key criteria including, for example, user interests, seasonality, content provider and advertising provider distribution criteria, and the like. According to one aspect of the present invention, to be described more fully below, edit module 120 includes an innovative set of publishing tools (512) to facilitate generation/maintenance of a publication profile (640), from which edit module 120 acquires content objects to generate publications in accordance with the publication profile.

Distribution module 400 is operatively coupled to document server 100 and, as will be discussed, optionally distributes product and/or product subsidies to users based, at least in part, on the source and quantity of content provided to the users.

In a preferred embodiment, document server 100 is a minicomputer/server, such as an HP 9000 server sold by the Hewlett-Packard Company, although those skilled in the art will appreciate that document server 100 could be any type of other computing or electronic device(s) that performs the functions described herein and still fall within the spirit and scope of the invention. Network 200 is preferably the Internet, although an Intranet, local area network, or other type of public or private network, either wired (e.g., telephone, cable TV, etc.) or wireless (e.g., satellite, radio, cell phone, etc.), could also or additionally be used.

Devices 300 are shown in FIG. 1 as being capable of being configured in a wide variety of ways. For example, personal computer 310 is shown connected to printing device 320, which prints document 10320 for user 20320. Personal computer 310 is operatively coupled to network 200. In contrast, printing device 330, which prints document 10330 for user 20330, is operatively coupled to network 200 without an intervening personal computer or other electronic device. Printing device 350, which prints document 10350 for user 20350, is shown connected to electronic device 340, which could be a set top box, television set, palmtop personal digital assistant (PDA) or other type of electronic device that is operatively coupled to network 200. Finally, printing device 370, which prints document 10370 for user 20370, is connected to electronic device 360, which is operatively connected to network 200. The printing devices shown in FIG. 1 could be printers, such as the HP DeskJet 890 printer, HP LaserJet V printer, or other models of printers manufactured by HP or others; so-called "mopiers" or other multi-function printing devices that can print fax, scan, and/or copy, or any other device capable of transferring information to a printable media such as plain paper, specialty paper, transparencies, or other media capable of tangibly receiving such information and which can be easily carried about by the user.

Transmission module 150 is preferably located with document server 100. As FIG. 1 shows, printing module 380 could be located in any of the devices 300, such as in personal computer 310, printing device 330, or electronic device 340, operatively coupled via network 200 to document server 100, or it could be located within document server 100 itself, such as in knowledge module 170. According to one embodiment of the invention, transmission module 150 and printing module 380 represent software functions that execute on suitably programmed microprocessor(s) within a device 300 and/or document server 100. It will be appreciated, however, that special purpose hardware or other mechanisms could be employed to implement the innovative features and functions described below.

Figure 13:
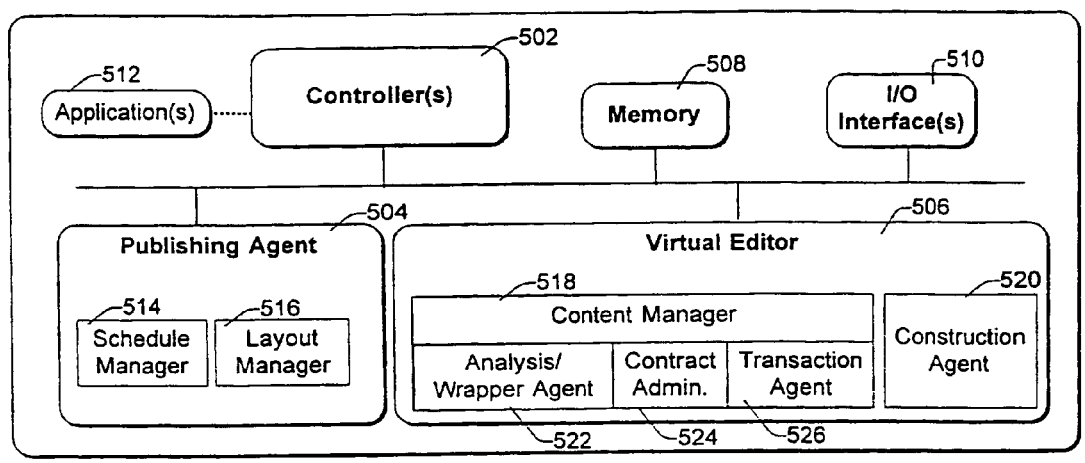
FIG. 13 illustrates a block diagram of an example edit module incorporating the teachings of the present invention.

FIG. 13 illustrates a block diagram of edit module 120 incorporating the teachings of the present invention. As shown, edit module 120 comprises one or more controller(s) 502, an innovative publishing agent 504, an innovative virtual editor 506, memory space 508 and one or more input/output (I/O) interface(s) 510, each coupled as depicted. According to one implementation of the invention, edit module 120 may well contain one or more application(s) 512 executable by controller(s) 502. Indeed, according to one embodiment to be described more fully below, edit module 120 includes an innovative set of publishing tools 512 that enable a producer (e.g., a registered user) to establish a publication profile that is used by edit module 120 to automatically create a publication. It will be appreciated that although depicted as separate and distinct functional entities, one or more functional blocks 502–510 may well be combined into common functional entities. Moreover, although depicted in accordance with a hardware paradigm, those skilled in the art will appreciate that edit module 120 and its constituent elements 502–510 may well be embodied as a series of executable instructions which, when executed by a host processor, implement the features and functions of edit module 120 to be discussed below. In this regard, FIG. 13 is merely illustrative of the scope and spirit of the claimed invention.

As shown, controller(s) 502 selectively invoke one or more of the virtual editor 506 to generate a custom document for a requesting and/or subscribing user, or publishing agent 504 to complete the layout and optimize the delivery schedule of such custom documents. Controller(s) 502 may initiate construction and/or delivery of a custom document in response to user interaction with a user interface (e.g., a web page), or to accommodate a user-selected delivery schedule. In this regard, controller 502 communicates with external applications (e.g., web page) or other elements (e.g., a user profile) via input/output (I/O) interface(s) 510. In an alternate embodiment, controller 502 provides a user with a user interface with which to request/build a custom document using one or more of applications 512. But for implementation of the teachings of the present invention, controller(s) 502 are intended to represent any of a broad range of control devices known in the art including, but not limited to, a programmable logic array (PLA), microprocessor, special purpose controller, application specific integrated circuit (ASIC), and the like. In an alternate embodiment, controller(s) 502 are embodied as a series of executable instructions which, when executed, implement the control logic described herein.

Memory device 508 and I/O interface(s) 510 are each intended to represent such devices commonly known in the art. I/O interface(s) 510, in particular, are intended to include one or more of any of a number of communication interfaces known in the art including, but not limited to, a direct connect communication interface (e.g., a serial interface, a parallel interface, a Universal Serial Bus (USB), an Advanced Graphic Port (AGP), etc.), a local area network interface (e.g., an Ethernet interface, a Token Ring interface, etc.), or a wide area network interface. In this regard, edit module 120 may communicate with any of a number of external and remote devices using an appropriate one of a plurality of wired and/or wireless I/O interfaces 510.

According to one aspect of the present invention, virtual editor 506 personalizes publications for a unique, composite publication based on a number of factors. As shown, virtual editor 506 includes a content manager 518 and a construction agent 520. The content manager 518 includes an analysis/wrapper agent 522, a contract administrator function 524 and a transaction agent 526. As editor module 120 receives content from one or more content providers, content manager 518 is selectively invoked by controller(s) 502. The analysis/wrapper agent 522 analyzes the received content and categorizes it based on any one or more of a number of attributes including, source, subject matter, length, cost, etc. In addition, analysis/wrapper agent 522 encapsulates the content object in a wrapper with a unique identifier. It will be appreciated, based on the description to follow, that the encapsulating wrapper enables virtual sensors (not shown) in the document distribution system to accurately track distribution, receipt and disposition of content objects. According to one embodiment, virtual sensors are embedded within printing modules 380 to track distribution, receipt and disposition of encapsulated content objects.

According to one implementation, the contract administrator 524 is a database driven component that manages all of the contractual obligations of the users (subscribers, content providers, etc.) of the document delivery system. According to one implementation, contract administrator 524 maintains royalty calculation and display agreements for select content providers (e.g., artists), the advertising rates for other content providers (e.g., advertisers), subscription information for select users, and the like. Periodically, contract administrator 524 accesses one or more content provider databases to identify content object distribution, to compute royalty payments, advertising bills and subscription bills for distribution to appropriate users via the transaction agent 526. In this regard, contract administrator 524 ensures that contractual obligations of the document delivery system are adhered to.

Transaction agent 526 is the primary interface between the document delivery system and a public/private e-commerce financial system (e.g., the CheckFree™ financial network offered by CheckFree Corporation). As introduced above, the transaction agent 526 is responsible for executing payments and account credit/debit transactions with user accounts based, at least in part, on the distribution of content objects in accordance with the terms and conditions maintained in contract administrator 524. It should be noted that although depicted as an element of edit module 120, those skilled in the art will appreciate that content manager 518 may well be deployed as an separate and independent functional entity without deviating from the spirit and scope of the present invention.

The construction agent 520 of virtual editor 506 extracts content objects to generate a custom document according to one or more key contributors. As used herein, the key contributors include one or more of a requesting/subscribing user's interests, demographics, seasonality, document server requirements, and content provider usage criteria, and the like. As will be described in greater detail below, construction agent 520 extracts content objects which are likely to be of interest to a particular user and generates a personalized publication for that user. The construction agent 520 utilizes information received via overt and covert processes of document delivery system 10 to log a user's interaction and disposition of received material, as well as soliciting feedback from the user, to improve the user's satisfaction with subsequent personalized publications. Information gathered as a result of these overt/covert processes are used by construction agent 520 to update a user profile associated with the user, which is accessed when generating a personalized publication. In this regard, construction agent 520 performs functions commonly associated with a physical editor of, say, a magazine: publication content decisions, layout and format decisions, advertising and the like, yet it factors in other key information such as personal preferences to generate personalized publications for up to millions of individuals. Once construction agent 520 has extracted content objects to generate the publication, it is passed to publishing agent 504, to finalize layout and schedule delivery of the personalized publication to the intended recipient(s).

In accordance with the illustrated example embodiment, publishing agent 504 is presented comprising schedule manager 514 and layout manager 516. As will be described in greater detail below, layout manager 516 receives the content objects from construction manager 506 and finalizes at least a partial layout of the personalized publication. According to one aspect of the invention, layout manager 516 maintains a record of the time required to complete at least a partial layout of the publication in order to determine the complexity of the personalized publication. This indicator of complexity is subsequently used by publishing agent 504 in estimating the time required to layout future publications containing one or more of the same content objects, and to aid schedule manager 514 in estimating the time required to complete publication.

Once layout manager 516 has completed at least a partial layout of the publication, schedule manager 514 completes the publication layout (e.g., with last minute content objects, or updates to such objects), and schedules delivery of the personalized publication. According to one embodiment, to be described more fully below, schedule manager 514 utilizes information from a number of available sources to schedule delivery of the publication. More particularly, schedule manager 514 utilizes information from the user's personal profile, a complexity measure from layout manager 516, and an indication from printing devices associated with the user confirming that an adequate amount and type of media is available for printing the publication. Based, at least in part, on such information, schedule manager 514 works to establish an optimum publication schedule for one or more personalized publications.

As introduced above, edit module 120 includes an innovative publishing tool set 512 from which a producer can register to publish publications utilizing the innovative features of document server 100. According to one implementation, publishing tool set 512 includes a user interface (UI) which, when invoked, enables a user to create and/or update a publication profile. As will be developed more fully below, the publication profile includes information regarding one or more of the publication title, producer contact information, the topic or genre of the publication, the scope of the publication, the content providers and/or advertising providers to use, publication layout information, a publication schedule, and the like. The publication profile created/updated by the publishing tool set 512 is maintained in knowledge module 170. In addition to the registration/publication profile UI, publishing tool set 512 may also include other advanced publishing tools that, for example, aid the producer in selecting an appropriate publication layout, provide readership demographic information for targeted advertising, and the like. Once the publication profile is set, publishing agent 504 and/or edit module 506 establish publication schedules based, at least in part, on the information maintained in the publication profile to automatically schedule generation and publication of publications without further invocation/input from the producer. Thus, according to this innovative aspect of the present invention, the producer merely establishes a publication profile from which document server 100 automatically gathers appropriate content to generate a publication on a schedule dictated by the publication profile.

Figure 14:
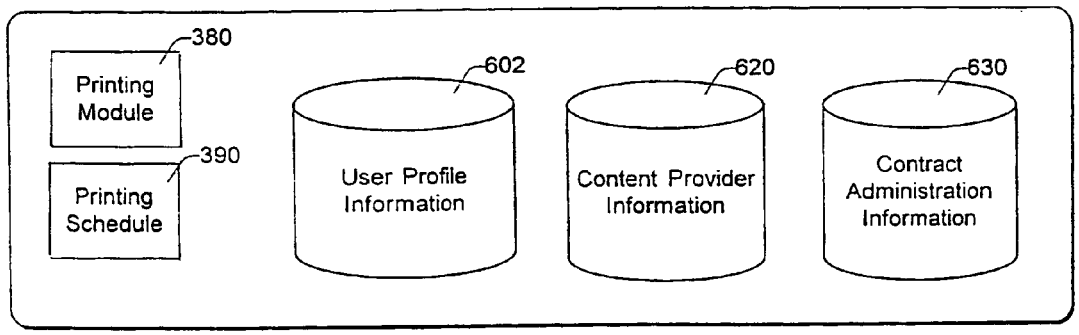
FIG. 14 illustrates a block diagram of an example knowledge module including user profile information and content provider information.

FIG. 14 illustrates an example knowledge module 170, according to one embodiment of the present invention. As shown, knowledge module 170 comprises user profile information 602, content provider information 620, contract administrator information 630, publication profile information 640 and optionally printing module 380 and printing schedule 390. As introduced above, document delivery system 10 in general, and edit module 120 in particular, continuously acquires or solicits information from users requesting personalized publications from the document delivery system, in order to better anticipate the informational and advertising needs of the user. In this regard, any of a number of personal information attributes are maintained in user profile information database 602. Content provider information 620 includes information received from virtual sensors, distributed throughout the document delivery system, regarding content object distribution, receipt and user disposition. Contract administrator information 630 includes information regarding the terms of use, usage/layout requirements, fee structures/schedules and the like for each of the content providers that provide content objects to document delivery system 10. As introduced above, the publication profile information 640 includes information provided by a publisher from which a document server (e.g., 100) automatically generates and distributes publications. Although depicted as a functional element of document server 100, those skilled in the art will appreciate that knowledge module 170 may well be utilized by other document servers (not shown) in document delivery system 10, or may well be integrated in another and/or stand-alone element of document delivery system 10 without deviating from the scope or spirit of the present invention.

Figure 15:
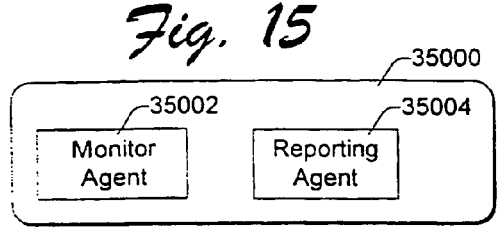
FIG. 15 is a block diagram of an example virtual sensor, according to one embodiment of the present invention.

FIG. 15 illustrates a block diagram of an example virtual sensor, according to one implementation of the present invention. As introduced above, one or more virtual sensors 35000 are selectively distributed throughout document delivery system 10 to monitor and report on the distribution, receipt and user disposition of content objects. According to one implementation, virtual sensor(s) 35000 are incorporated into printing module 380 throughout document delivery system 10. In accordance with the illustrated example embodiment of FIG. 15, virtual sensor 35000 is shown comprising a monitoring agent 35002 and a reporting agent 35004, communicatively coupled as depicted.

As used herein, monitoring agent 35002 receives network traffic and analyzes the traffic for distribution of content objects which are traceable back to a particular edit module (e.g., 120) and/or document delivery server (e.g., 100). According to one example implementation, monitoring agent 35002 analyzes the received network traffic for content objects wrapped in trace wrappers (to be described more fully below). The trace wrapper information uniquely identifies the content object and, optionally, the edit module or document delivery server responsible for the distribution of the content object. Reporting agent 35004 is invoked to compile and issue a report to one or more document delivery server(s) 100 identifying document distribution, receipt and user disposition of received content objects. Although illustrated in accordance with a hardware paradigm, the virtual sensor 35000 and/or one or more of its constituent elements may well be implemented by a series of executable instructions that carry out the functions to be described more fully below.

Similarly, content provider information database 620 is used by document delivery system to maintain a history of content object distribution, receipt and disposition. According to one aspect of the invention, contract administrator 524 utilizes information maintained in content provider information database 620 to periodically calculate royalty payments, advertising bills, and subscription bills. Example user profile information and content provider information data structures are illustrated with reference to FIGS. 16A and 16B.

FIG. 16A graphically illustrates an example user profile data structure 602, suitable for use by the innovative document delivery system. According to the illustrated example implementation, user profile information data structure 602 includes a user_name field 604, a user_id field 606, a contact information field 608, an interest information field 610, a subscription information field 612, a disposition information field 614, and a feedback information field 616. As introduced above, some of the information maintained in user profile data structure 602 is overtly obtained, e.g., by asking the user for such information during a registration period. Other information such as, for example, disposition information, is covertly obtained by monitoring the disposition of trace wrappers by the user, e.g., how much time did the user spend with certain information, did the user forward certain information to others, etc. In this way, the user profile data structure 602 is a continuously evolving, continuously improving, set of information reflecting the current interests of the users of the document delivery system.

FIG. 16B illustrates an example data structure comprising content provider information, according to one embodiment of the present invention. In accordance with the illustrated example embodiment, content provider information data structure 620 includes a content provider name field 622, a content provider ID field 624, a wrapper ID field 626 for each of the content objects provided by the content provider, a rate schedule field 628, a monthly usage field 630 and feedback information field 630.

FIG. 16C graphically illustrates an example data structure comprising publication profile information, according to an example embodiment of the present invention. As shown, publication profile 640 includes a publication name field 642, a producer identifier field 644, producer(s) contact information field 646, an interest (topic, genre, etc.) information field 648, source (content provider 50) information field 650, an advertising (content provider 80) information field 652, and a delivery schedule field 654. As alluded to above, data structures of greater or less complexity may well be utilized to maintain user profile information and/or content provider information without deviating from the spirit and scope of the present invention.

Figure 2:
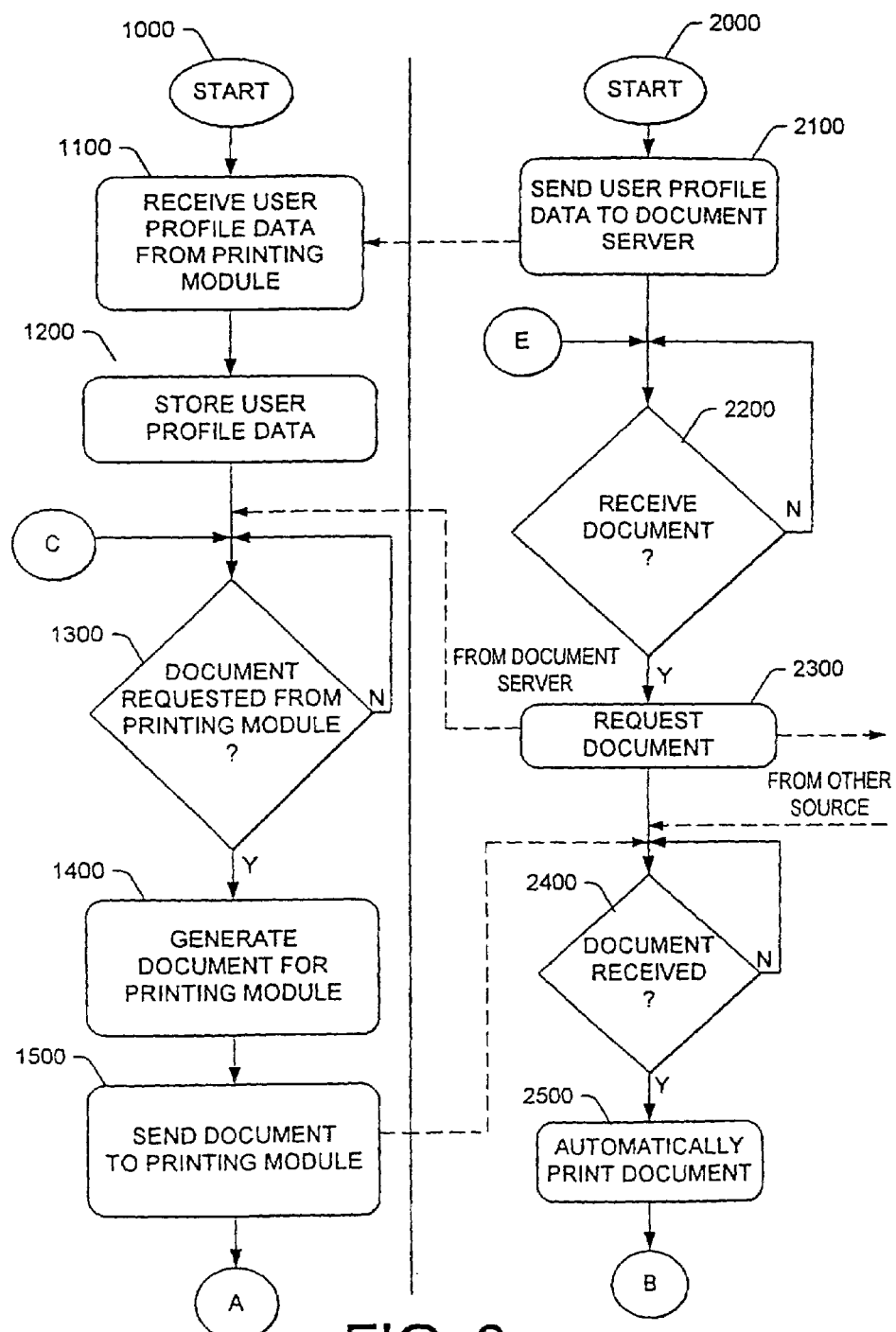
FIGS. 2–4 illustrate flowcharts detailing the operation of the transmission module and the printing module of the document delivery system of one embodiment of the invention.
Figure 3:
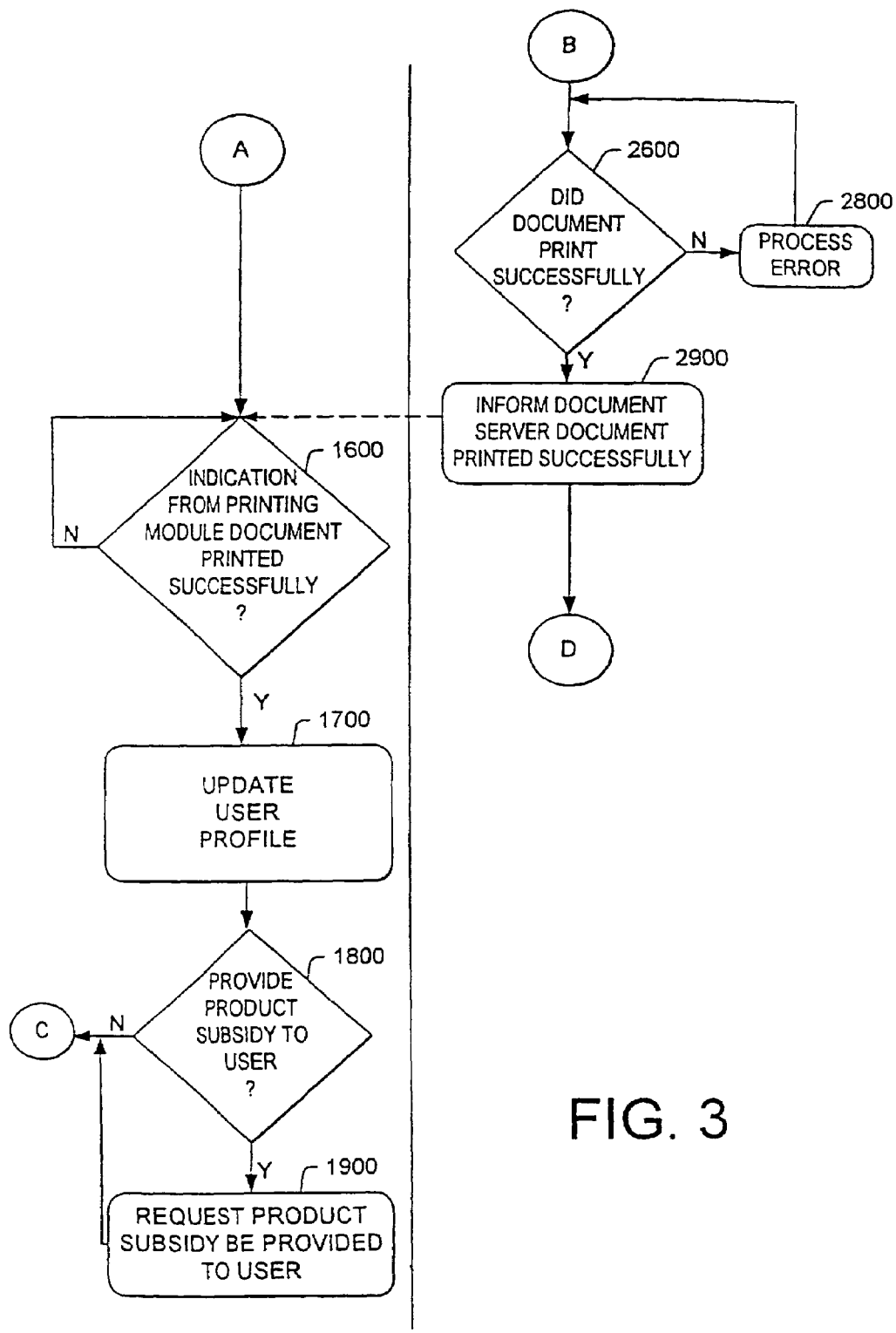
Figure 4:
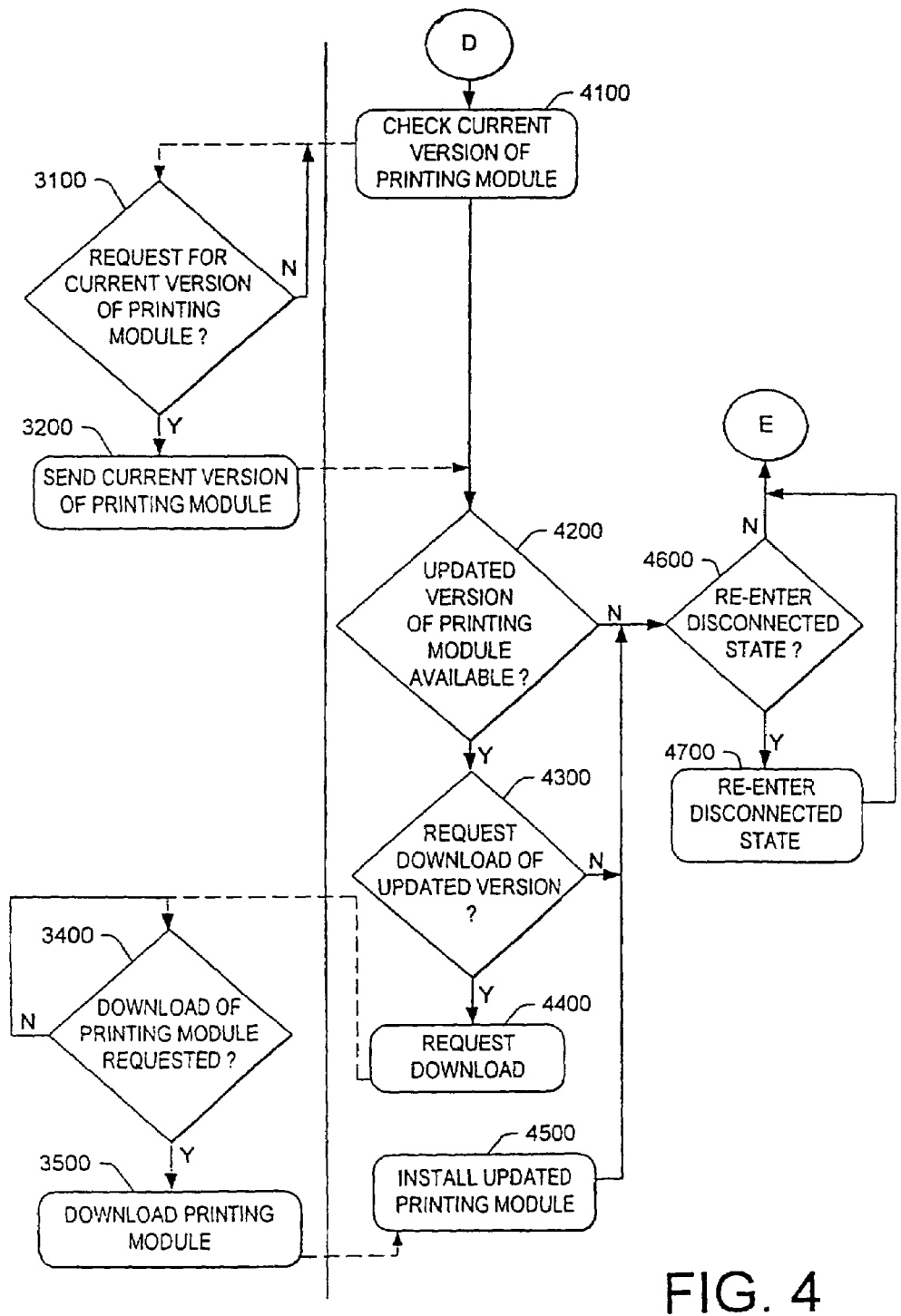

Turning to FIGS. 2–4, flowcharts detailing the operation of transmission module 150 and a first mode of operation of printing module 380 are presented, according to one embodiment of the invention. In FIGS. 2–4, the flow diagram shown in the left column is executed by transmission module 150 of document server 100, and the flow diagram in the right column is executed by printing module 380.

Referring now to FIG. 2, the flow diagram for transmission module 150 starts in block 1000, and the flow diagram for printing module 380 starts in block 2000. Since there is a great deal of interaction between these two flow diagrams, as represented by dashed lines connecting the two columns, the operation of the two flow diagrams will be described simultaneously.

Figure 5:
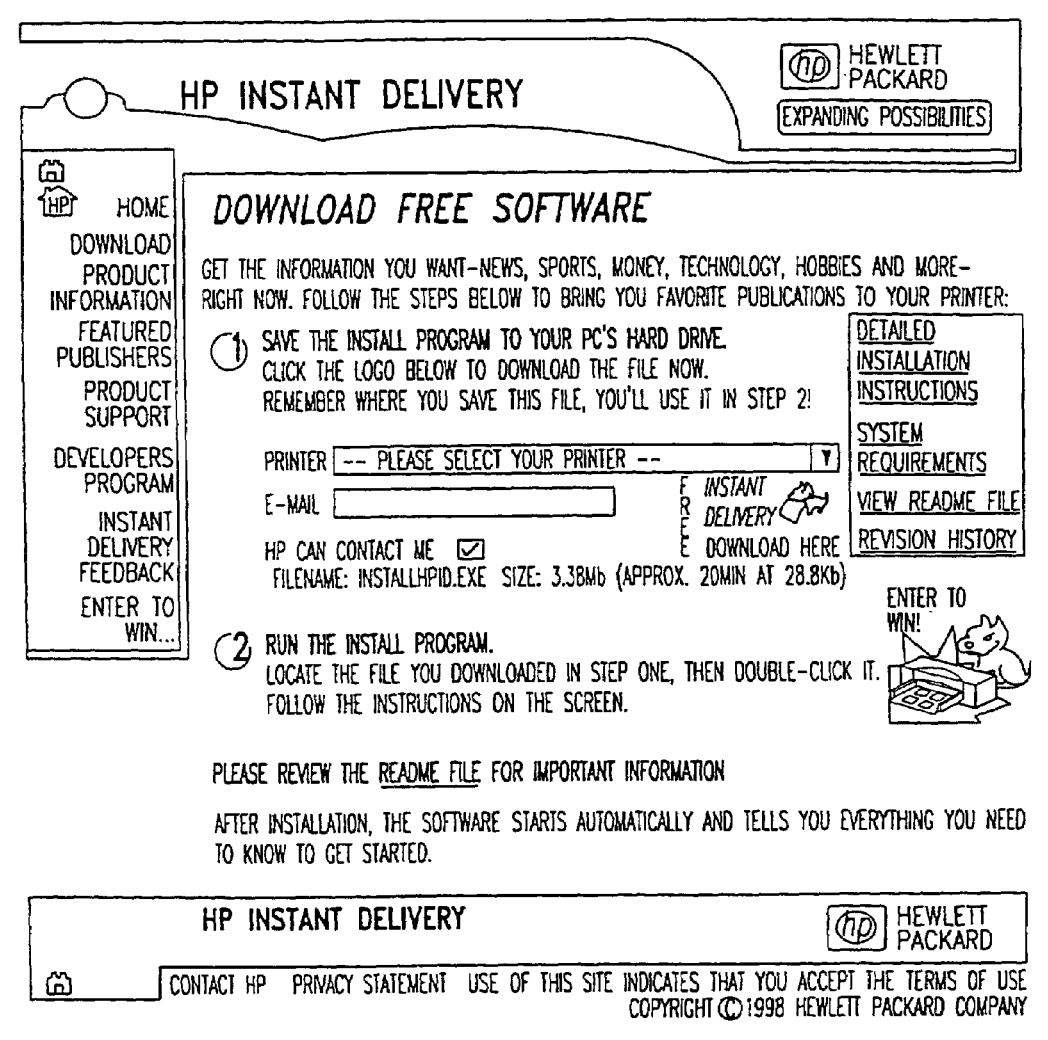
Figure 6:
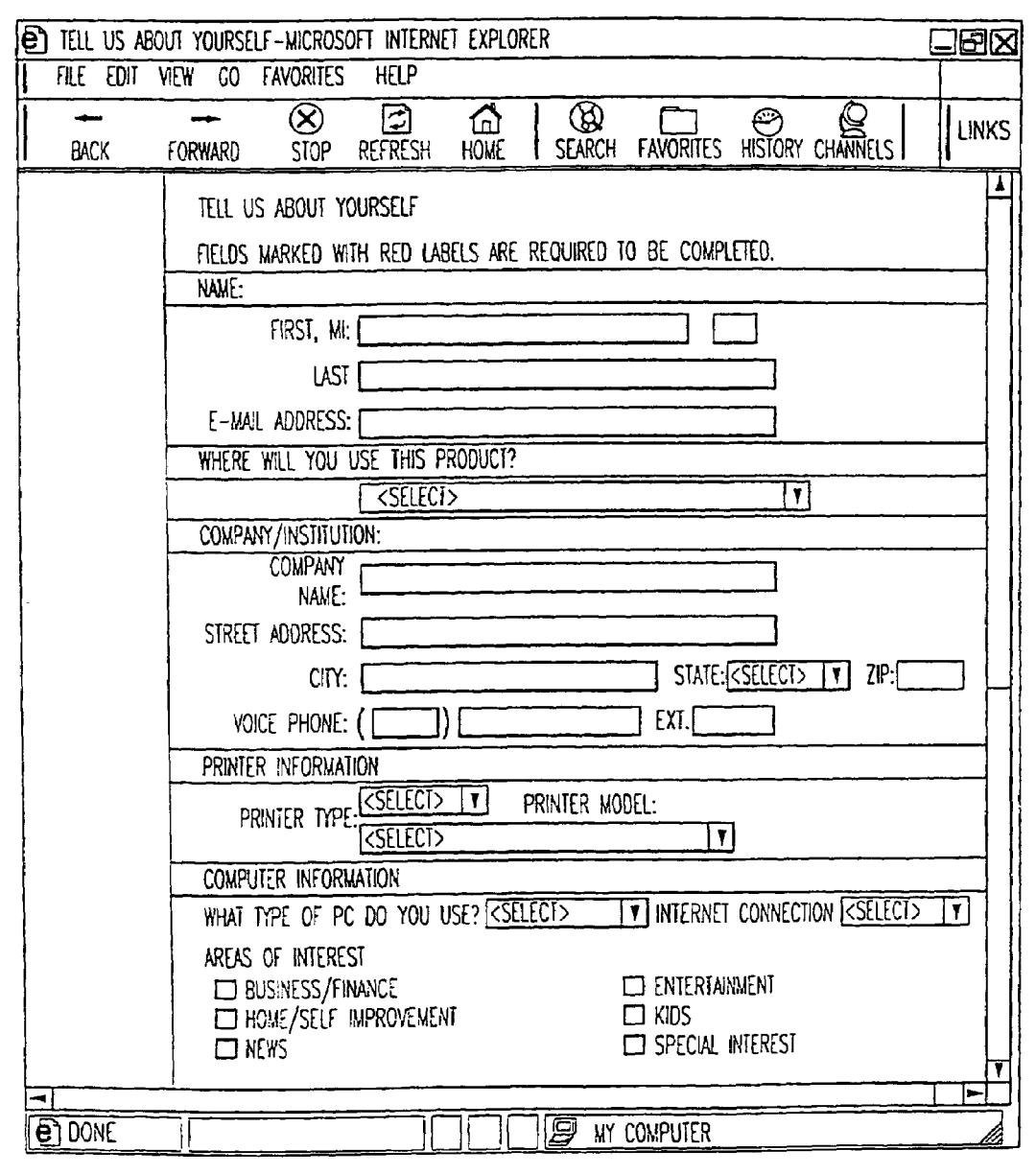

In block 2100, user profile data is sent to document server 100 to be stored in the user profile. This user profile data can take on many different forms, from simple to very detailed. FIG. 5 shows a very simply acquisition of user profile data such as that used in HP's Instant Delivery Program, the first version of which was generally available to the public less than one year from the filing date of this patent application. In this program, only three pieces of information are stored in the user profile: type of printer, email address, and whether HP can contact the user. FIG. 6 shows a more complicated user profile than that currently used in HP's Instant Delivery Program, which includes the user's name, email address, company name, city, state, country, zip or postal code, phone number, printer information, and areas of interest. Those skilled in the art will appreciate that more or less user profile data from those shown in FIGS. 5 and 6 could be sent to transmission module 150 in block 2100 and still fall within the spirit and scope of the invention, and that at least some of this information could come from a source other than a user. For example, the user profile data could also include household income, age, and sex of the user, among other things. In any event, block 1100 receives the user profile data sent by block 2100. Block 1200 stores the user profile data, preferably in knowledge module 170. Alternately, the user profile data could be stored in device 300 or in some other local or remote location.

Block 2200 checks to see whether a document should be received form document server 100. This is done by checking print schedule 390 which is preferably stored on a device 300 or document server 100, but may be stored in some other local or remote location. Printing schedule 930 preferably contains information that can be used to determine when documents should be printed by the printing device, such as upon document creation, user requested time, lapse of specified time period, and/or occurrence of one or more external events (e.g., a stock price or index reaching a specified value, a final score of a sporting event, etc.). Printing schedule 390 may be associated with an individual user, a device or a group or users and/or devices. In addition, each entry of printing schedule 390 could result in the printing of one or more documents.

FIG. 7 shows one example of printing schedule 390, of the type that might be used in an enhanced version of HP's Instant Delivery program. In this example, the title of delivery, delivery schedule, next delivery data and time, and the last deliver status are shown. Preferably, the user can select what time a document should be printed, whether it should be printed on a specific day of the week or month, weekdays, or weekends, and whether the printing schedule should expire after a specific period of time or continue indefinitely.

Referring again to FIG. 2, printing module 380 monitors printing schedule 390 to see if a document should be requested from document server 100 or from another source. When block 2200 determines that a document should be requested from document server 100 or from another source, block 2200 is answered affirmatively, and block 2300 automatically requests the document without user intervention from server 100 or from another source, as will be described in greater detail below. Note that if printing module 380 is located on device 300, block 2200 operates in a "pull" mode—where the document is "pulled" from document server 100 or another source to device 300. However, if printing module 380 is located remotely from device 300, such as in document server 100, block 2200 operates in a "push" mode—where the document is "pushed" from document server 100 or another source to device 300. If block 2300 determines that the document is located on document server 100 or at another source accessible via network 200, and if device 300 is currently in a disconnected state where it is not operatively coupled to the network 200, block 2300 will sign on to or otherwise enter a connected state with network 200, so that device 300 is operatively coupled to network 200.

Meanwhile, block 1300 checks to see if a document has been requested from printing module 380 in block 2300. Once it determines that such a document has been requested, block 1400 generates the document for printing module 380. Block 1500 then sends the document to printing module 380. Block 2400 checks to see whether a document has been received from document server 100 via block 1500. Once such a document has been received, block 2500 automatically prints the document, without user intervention, on a printing device. The term "without user intervention" means that a user is not directly involved in the printing operation; the document is sent automatically to a device 300 to be printed out by a printing device. According to this mode of operation, the user does not press "any" print buttons or otherwise be directly involved in the printing process; in fact, the user may not even be present in the same room, city, state, or country as device 300 during the printing operation. The printing operation automatically occurs in an unattended state—regardless of whether the user is present or not. In addition, if print schedule 390 is stored in a device-independent manner, such as on document server 100, a travelling user could "log in" to document server 100 and have his or her customized document sent to a device 300 that is convenient to the user's current location.

Referring now to FIG. 3, block 2600 checks to see whether the document printed successfully. If not, block 2800 performs error handling, such as attempting to print the document again, notifying the user that the printing device is out of paper or has some other error condition, or simply deciding not to print the document. When the document prints successfully, block 2900 informs document server 100 that the document printed successfully. Block 1600 waits for an indication from printing module 380 that the document did print successfully. When such an indication is received, block 1700 updates the user profile with this information.

It will be appreciated that not all of the blocks in FIGS. 2–4 need be implemented, or implemented according to the order denoted, to fall within the spirit and scope of the present invention. More specifically, according to one implementation, flow of control moves from block 2600 to block 4100 of FIG. 4, as will be discussed later, and from block 1500 back to block 1300 of FIG. 2. An alternate embodiment has been contemplated where other information is transmitted back to document server 100 in block 2900 to update the user profile preferably stored in knowledge module 170. This other information could be ink usage (total usage or usage broken out by ink color), printable media usage (number of pages printed, type of media used, etc.), or other types of information. In addition, another alternate embodiment has been contemplated where some or all of the information contained in the user profile stored in knowledge module 170 came from a source other than the user via printing module 380. For example, publicly or privately available information about the user, and/or the devices 300 he/she/they use, could be acquired from a wide variety of different sources and inserted into the user profile preferably stored in knowledge module 170.

Block 1800 examines the user profile preferably stored in knowledge module 170 to determine whether a product subsidy should be provide to the user. For example, if the information in the user profile indicates that this user has printed off his $1000^{th}$ document, such as a "preferred" document that contains advertising from advertising providers 80 or is otherwise under the control of edit module 120, providing a product subsidy to the user may be warranted. For purposes of this invention, a "product subsidy" could be a print consumable or other product. A "print consumable" is an inkjet cartridge for an inkjet printer, ink for such an inkjet cartridge, a toner cartridge for a laser printer, toner for such a toner cartridge, or any other product or substance that is depleted when a document gets printed, including printer ribbons, etc. Note that the "ink" referred to above would typically be of a permanent variety, but erasable ink, such as that sold by the Eink Company, could also be used.

Note that the product subsidy referred to herein is preferably funded at least in part by advertising revenue received from advertising providers 80 (FIG. 1), but an embodiment has been contemplated where the product subsidy is funded at least in part from the distribution revenue received from content providers 50 (FIG. 1). In either case, information (such as statistical information) about what was printed by whom is preferably provided to content providers 50 and/or advertising providers 80—preferably as a document that is automatically sent to one or more printing devices according to the teachings of this invention.

Other forms of products that are contemplated to be subsidized by this invention include printable media, such as plain paper, specialty paper, transparencies, and the like, and may also include devices 300 such as printing devices, electronic devices, and personal computers. In fact, alternate embodiments have been contemplated where other products, such as a subscription price to a document, or even a product not directly related to the document delivery system shown herein, such as soap or dog food, are subsidized. If block 1800 determines that such a subsidy is warranted, block 1900 requests that distribution module 400 provides such a subsidy to the user. In one embodiment, distribution module 400 simply mails a product such as a print consumable or other product such as the type described above to a user at the address specified in the user profile. In another embodiment, distribution module 400 mails or electronically generates a coupon that the user can use to receive a free or discounted product of the type described above. Regardless of whether block 1800 is answered affirmatively or negatively, flow of control then returns back to block 1300 (FIG. 2) to see if another document has been requested from the printing module 380.

Referring again to FIG. 3, after block 2900 informs document server 100 that the document printed successfully, flow of control moves to block 4100 (FIG. 4), which checks with document server 100 to see what the current version of printing module 380 is. Block 3100 checks to see whether such a request has been received, and when it is, block 3200 sends information concerning the current version of the printing module to printing module 380. Block 4200 compares this information from document server 100 with its own version and determines whether an updated version of printing module is available. For example, if printing module 380 is running version 4.0, and document server 100 indicates that version 4.1 is the current version of printing module 380, block 4200 would determine that an updated version of printing module 380 is available, and flow control would move to block 4300. Block 4300 checks to see whether this updated version of printing module 380 should be requested to be downloaded. While a user would typically be asked whether such a download should be requested or not, and would typically perform this download at a convenient time, such a step could also be performed automatically without user intervention. If such a download is requested, block 4400 is answered affirmatively, and block 3500 downloads the updated printing module, which is then installed in block 4500. Regardless of how blocks 4200 and 4300 are answered, flow of control moves to block 4600, which checks to see if a disconnected state should be entered. If block 2300 (FIG. 2) determined that device 300 was in a disconnected state when the document was requested, as discussed above (i.e., not operatively coupled to network 200), block 4600 is answered affirmatively, and block 4700 reenters the disconnected state. In any event, flow of control returns to block 2200 of FIG. 2.

Referring again to print schedule 390 shown in FIG. 7, it can be seen that many different types of documents can be requested to be printed. For example, the title of document 11000 specifies a network address, such as an Internet uniform resource locator (URL) that contains the network location of a document to be printed. Note that this URL may be partially or completely hidden from the user, as is the case with the URL for document 15000. In this scenario, edit module 120 of document server 100 merely goes out to the Internet at the URL indicated (which would be shown in FIG. 1 as one of the content providers 50), and captures the indicated document, which is then transmitted to a printing device via transmission module 150 and printing module 380, as has been discussed. Alternatively, device 300 could go directly out to the URL itself without assistance from document server 100; in this case, block 2300 (FIG. 2) requests document 11000 from another source—directly from the content provider 50 (at the indicated URL) via network 200.

In contrast, document 12000 is not a document that originates with a content provider 50 via the Internet, but instead is stored directly on device 300, such as a printing device, personal computer, or other electronic device. An example of such a document could be a daily calendar from a program such as Microsoft Outlook, which the user has requested be printed automatically to his printer, without any user intervention at 7:00 a.m. every weekday morning. In such an embodiment, printing module 380 does not need to request the document from document server 100, since it can access the documents without going through network 200. In this embodiment, block 2300 of FIG. 2 requests the document from another source—device 300. While block 2900 would still preferably indicate that the document was printed, and while block 1700 would still preferably update the user profile in knowledge module 170, printing such a document would preferably not generate any type of credit towards a product subsidy, since such a document would not be considered a "preferred" document, e.g., not a document under the control of edit module 120.

Referring again to FIG. 7, a print schedule of document 13000 is shown. Document 13000 is referred to as a "personalized document". A "personalized document" is a document that is assembled by edit module 120 of document server 100 from a variety of content providers 50 and advertising providers 80, based on information contained in the user profile stored in knowledge module 170. For example, document 13000 is a "personalized document". Our user has requested that document 13000—his personalized newspaper—be printed at 6:00 a.m. every day. Edit module 120 examines the user's interests as specified in the user profile stored in knowledge module 170 to assemble the document from selected content providers 50 in which the user has indicated an interest. Edit module 120 also inserts advertising from selected advertising providers 80—again based on the user profile stored in knowledge module 170.

Figure 8:
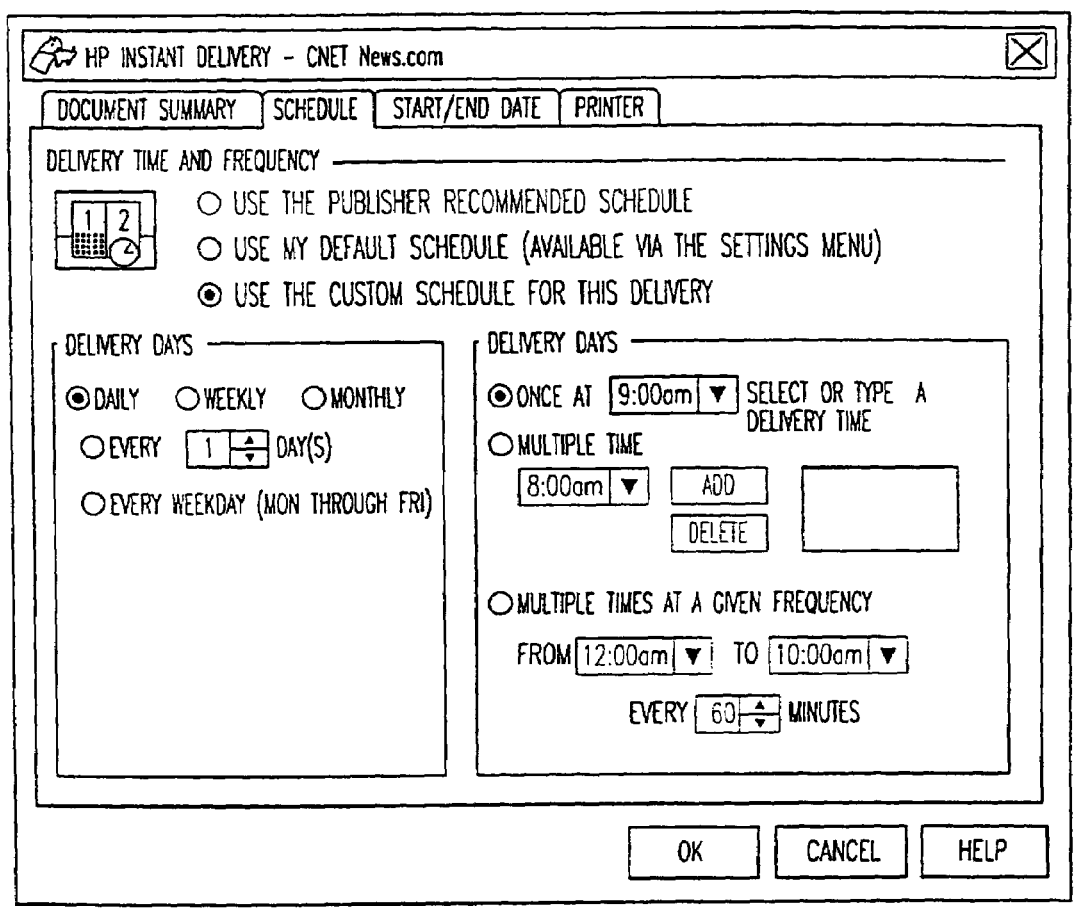
FIG. 8 shows how the print schedule of FIG. 7 can be modified by the user.
Figure 11A:

FIG. 8 shows how the print schedule 390 of FIG. 7 can be edited by the user. The user can use the publisher's recommended schedule, use a default schedule the user has set, or use a custom schedule for delivery. If a custom schedule is selected, the user can select a daily, weekly, or monthly delivery, or select a delivery once every specified number of days, or specify every weekday. In addition, the time of day can also be specified: once at a designated time, multiple times during the day, or multiple times separated by a specified period of time. While not shown here, the user could also edit print schedule 390 to request that a document be sent upon creation, or upon the occurrence of an external event.

FIGS. 9A–9B show document 11000 printed by the printing device according to one embodiment of the invention. Note that this document came from one content provider 50 via network 200 (either through document server 100 or directly), and contains no advertising. While document 11000 is preferably formatted by content provider 50 such that the information contained in the document is optimized to be printed, such formatting is not necessary.

Figure 10:
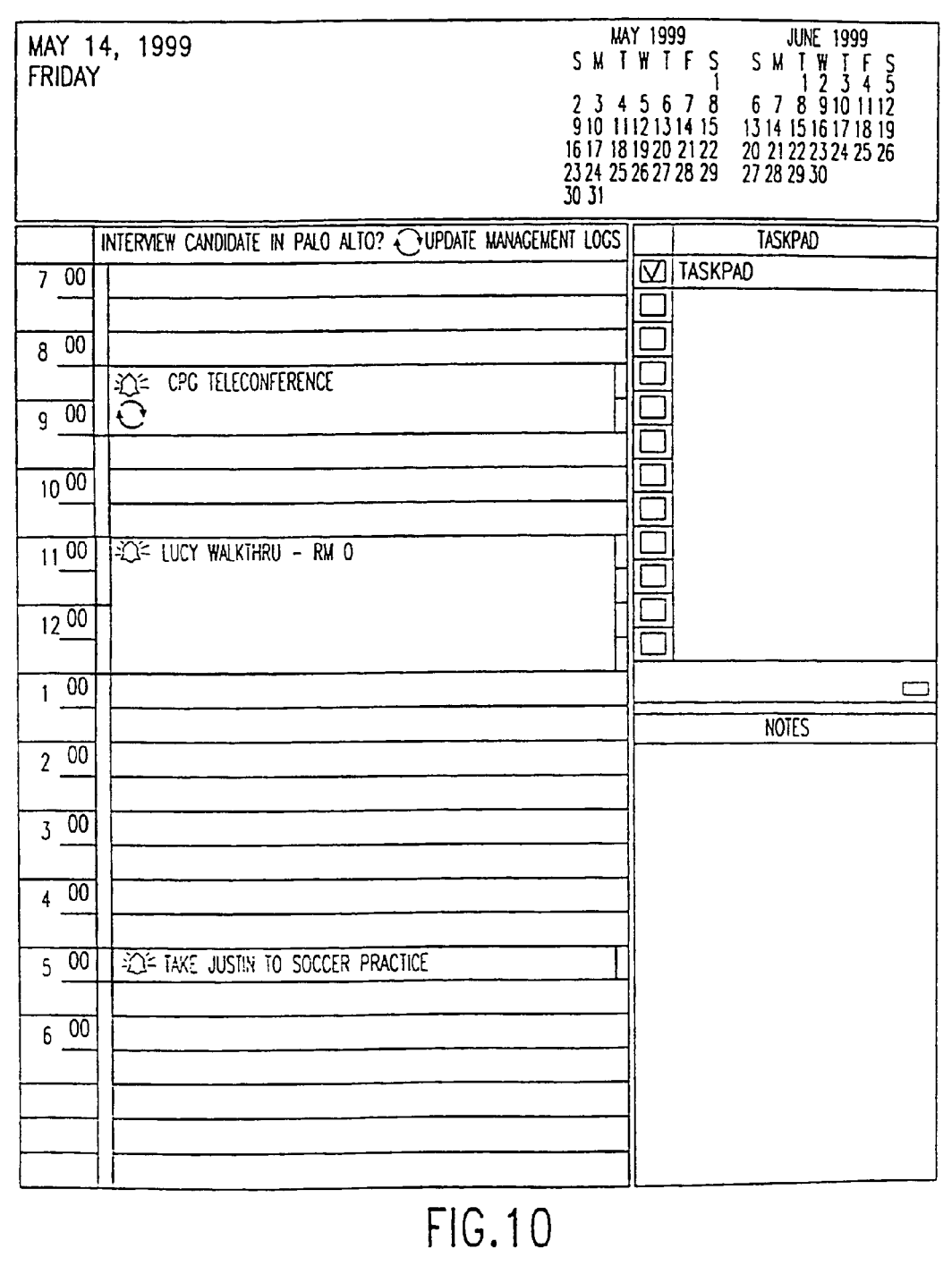

FIG. 10 shows document 12000 printed by the printing device according to one embodiment of the invention. Note that this document is a user's daily calendar which came directly from device 300 and not from document server 100 via network 200.

FIGS. 11A–D show document 1300 printed by the printing device according to one embodiment of the invention.

Note that this document is a user's personalized newspaper which contains information in which the user has indicated a specific interest in, as stored in the user profile in knowledge module 170. Note also that this document contains advertising that edit module 120 determined the user would also be interested in, again based on the information contained in the user profile stored in knowledge module 170. As has already been discussed, when the user prints a sufficient number of such "preferred" documents, the user may receive a product subsidy of a print consumable or other product(s).

FIG. 12 shows document 14000 printed by the printing device according to one embodiment of the present invention. Note that document 14000 is the HP Instant Delivery Times—a document located on document server 100. While this document does not contain advertising per se, it is still considered to be a "preferred document", since it is under the control of edit module 120. Document 14000 informs users of Instant Delivery of new releases or new information about the Instant Delivery Program.

Having introduced the basic operation of document delivery system 10, above, FIGS. 17–21 provide additional operational information regarding select aspects of the present invention.

Figure 17:
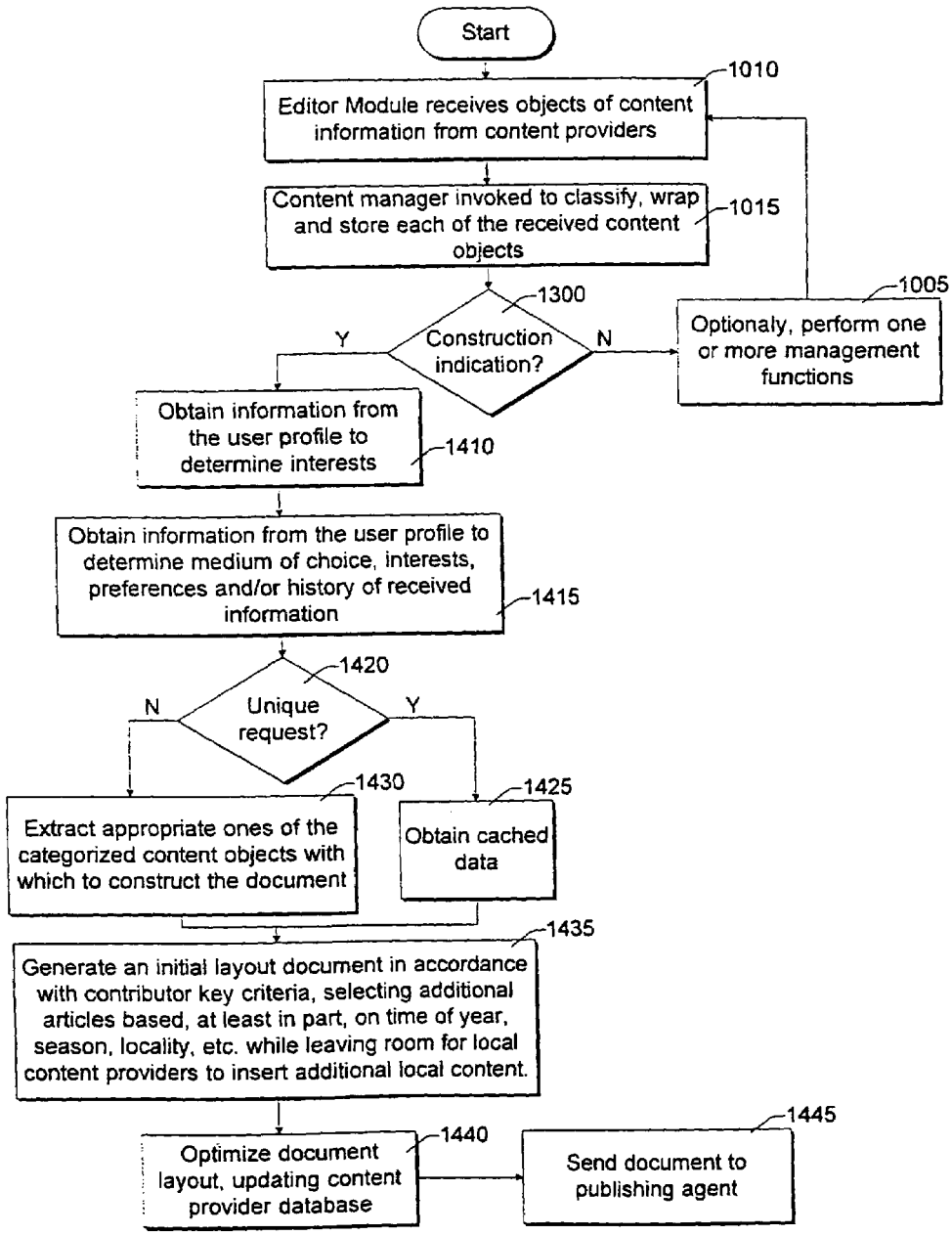
FIG. 17 illustrates a flow chart of an example method generating a custom document, according to one aspect of the present invention.

Accordingly, turning to FIG. 17, a flow chart illustrating an example method for generating a personalized document is presented. As shown, the method begins with block 1010, wherein editor module receives content objects from content providers 50 and/or advertising providers 80, and selectively invokes an instance of content manager 518. In response, content manager 518 classifies, wraps and stores each of the received content objects, block 1015. More specifically, as introduced above, content manager 518 invokes an instance of analysis/wrapper agent 522 to analyze and encapsulate the received content object in a trace wrapper having a unique identifier. According to one implementation, analysis agent 522 identifies meta data within the received content object to classify the content object. Once the analysis agent 522 has classified and encapsulated the received content object in a wrapper, content manager 518 updates the content provider information data structure 620 associated with the provider of the content object to denote the wrapper identifier for the received content object.

In block 1300, edit module 120 identifies whether an indication for construction of a personalized document has been received. As introduced above, such an indication may be generated by a requesting user via a user interface (e.g., a web page), or in response to an indication received from, for example, print schedule 390. In either case, if an indication is received, edit module 120 invokes an instance of the innovative virtual editor 506 to generate a personalized publication for delivery to the identified user. In this regard, virtual editor 506 invokes an instance of construction agent 520, which obtains information from a user profile associated with the identified user to determine user interests, block 1410. In block 1415, construction agent 520 obtains information from the user profile 602 to determine the medium of choice (e.g., send the publication electronically via email, send via fax, send to a local printer of the user, etc.), interests, preferences and/or a history of received information.

In block 1420, construction agent 520 determines whether the publication request is unique to an individual user, or whether the information has already been retrieved for another user. If content objects identified for publication have already been retrieved to satisfy another user request, construction agent 520 access local memory 508 to quickly retrieve the identified content objects, block 1425. Otherwise, in block 1430, construction agent 520 extracts the appropriate ones of the categorized content objects with which to generate a personalized publication.

In block 1435, construction agent 520 generates an initial layout of the personalized document using the extracted information. According to one implementation, construction agent 520 identifies additional content objects based, at least in part, on the already extracted content objects and other key contributor criteria (e.g., seasonality, locality, etc.) introduced above. Moreover, construction agent 520 may also leave room in the layout for inclusion of content by a local content provider (e.g., an ISP), through which the personalized publication will be transmitted en route to the identified user.

In block 1440, the construction agent 520 further optimizes document layout, updating the content provider information database 620 with an indication of which content objects have been utilized in construction of the personalized document. The personalized document created by construction agent 520 of virtual editor 506 is then sent to publishing agent 504, block 1445. As will be described below (FIGS. 19 and 20), layout manager 516 of publishing agent finalizes the layout and content (except for last minute, time sensitive content objects), while scheduling manager 514 optimally schedules delivery of the publication to include such last minute, time sensitive content objects. Publishing agent 504 then issues the personalized document for delivery to the user via transmission module 150 and a printing module 380 associated with the user.

Figure 18:
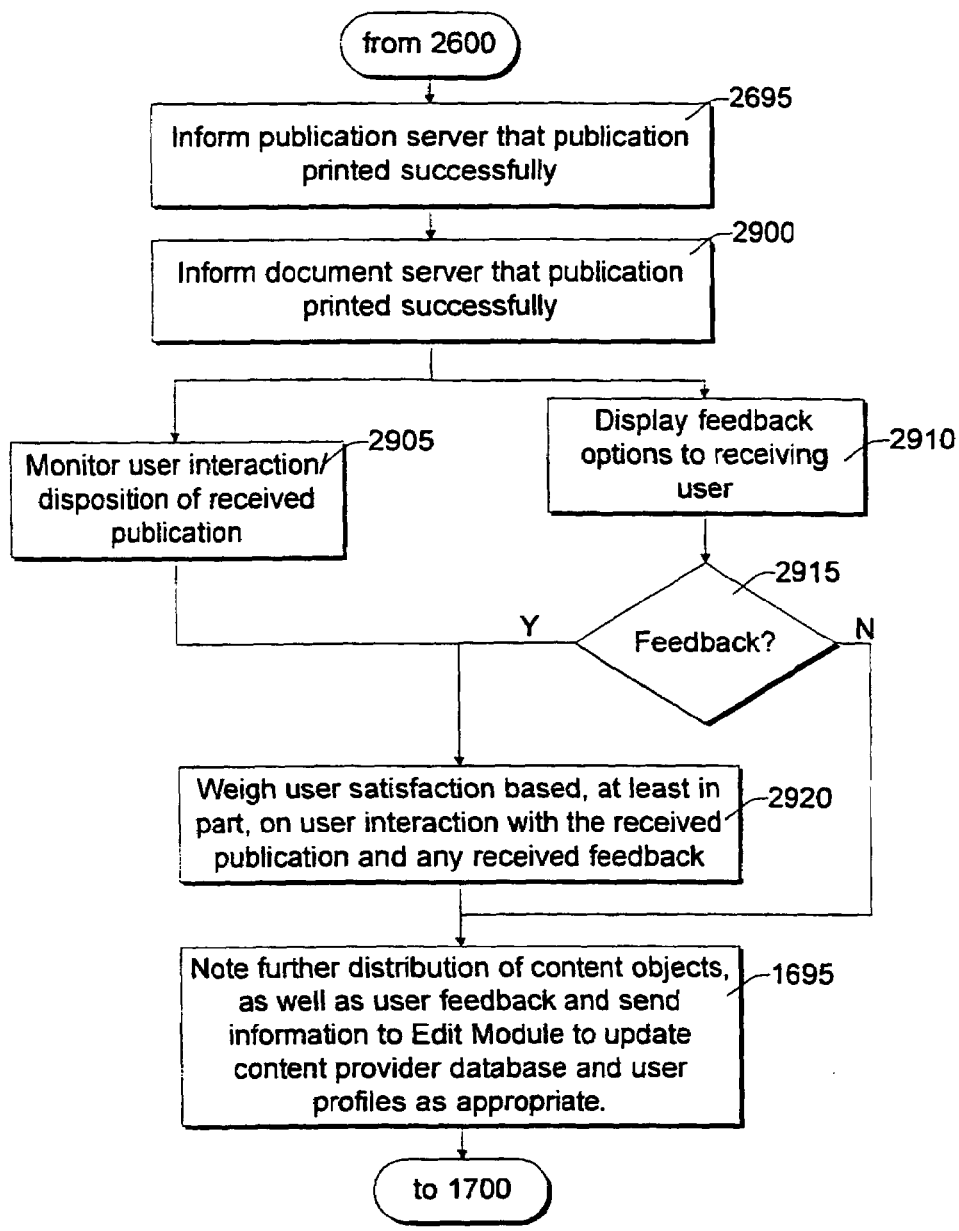
FIG. 18 illustrates a flow chart of an example method of operation for a client component of the document delivery system, according to one aspect of the present invention.

Turning to FIG. 18, a flow chart illustrating an example method of operation of an innovative printing module 380 is presented, according to one embodiment of the present invention. As introduced above, printing module 380 includes a virtual sensor (not shown) which detects and identifies trace wrappers for content objects comprising received personalized publications, providing document server 100 with confirmation of receipt of the content objects.

According to the illustrated example embodiment of FIG. 18, the method begins with block 2695, wherein printing module 380 informs the publication server that the publication was successfully printed. In block 2900, the document server 100 is informed that the publication was successfully printed. In response, content manager 518 updates the usage fields of the content objects comprising the received personalized document, for accurate accounting to content providers 50 and advertising providers 80. In block 2905, printing module 380 covertly monitors user interaction with the received publication. As introduced above, this covert monitoring (via sensors 35000, client application(s), etc.) records one or more of the distribution of content objects to a user, user receipt of content objects, whether the object(s) were printed or viewed on a display terminal, the duration viewed (if by terminal), whether any editing of the content object(s) occurred, and any other user interaction with the content object(s).

In parallel, according to one embodiment of the present invention, printing module 380 overtly queries the user for feedback on the received publication in general, and on one or more of the content objects in particular, block 2910. In block 2915, printing module determines whether the user has provided feedback.

In block 2920, printing module 380 weighs user satisfaction based, at least in part, on observed user interaction with the received publication and any received feedback from the user. In block 1695, printing module 380 notes any further distribution of the content objects comprising the personalized publication, and provides such information to edit module 120 to update user profile and content provider information data structures 602 and 620, respectively.

Figure 19:
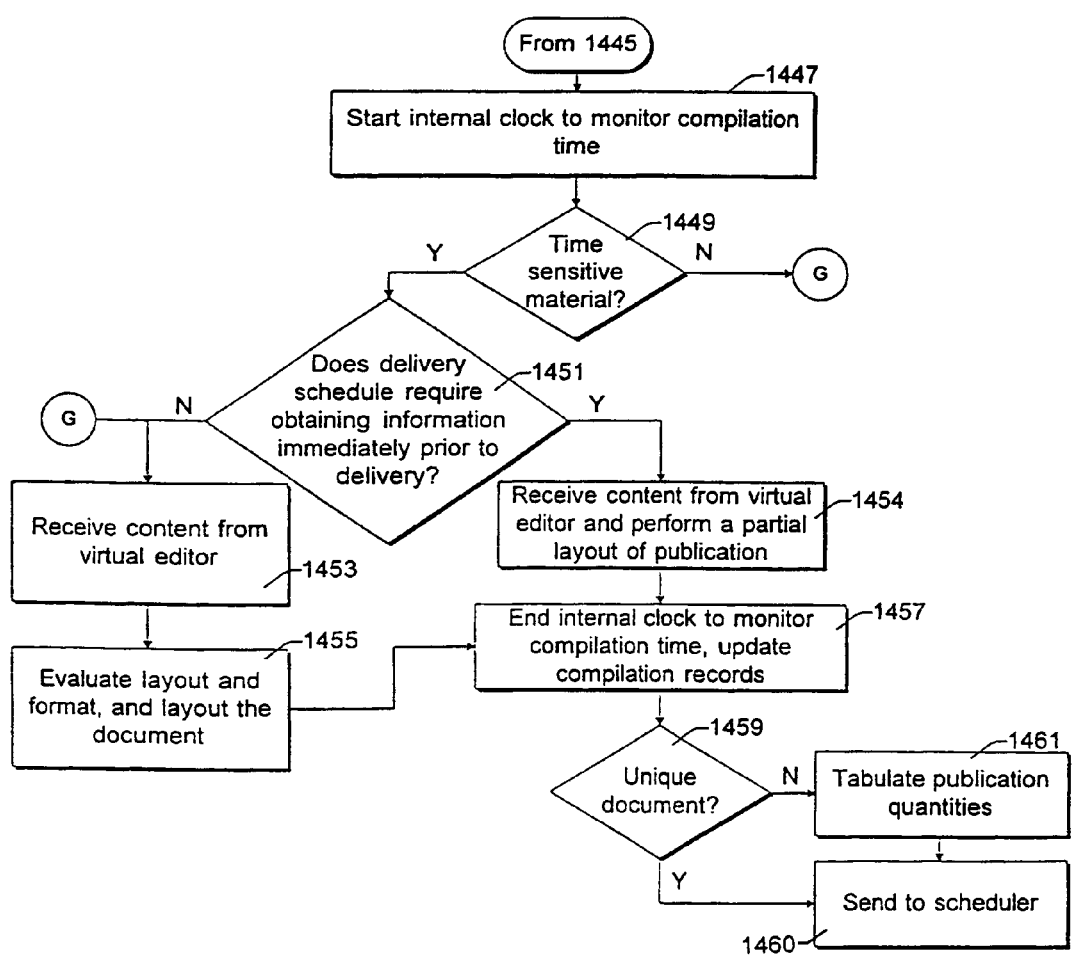
FIG. 19 illustrates a flow chart of an example method for laying out a custom document of otherwise disparate content objects, according to one aspect of the present invention.
Figure 20:
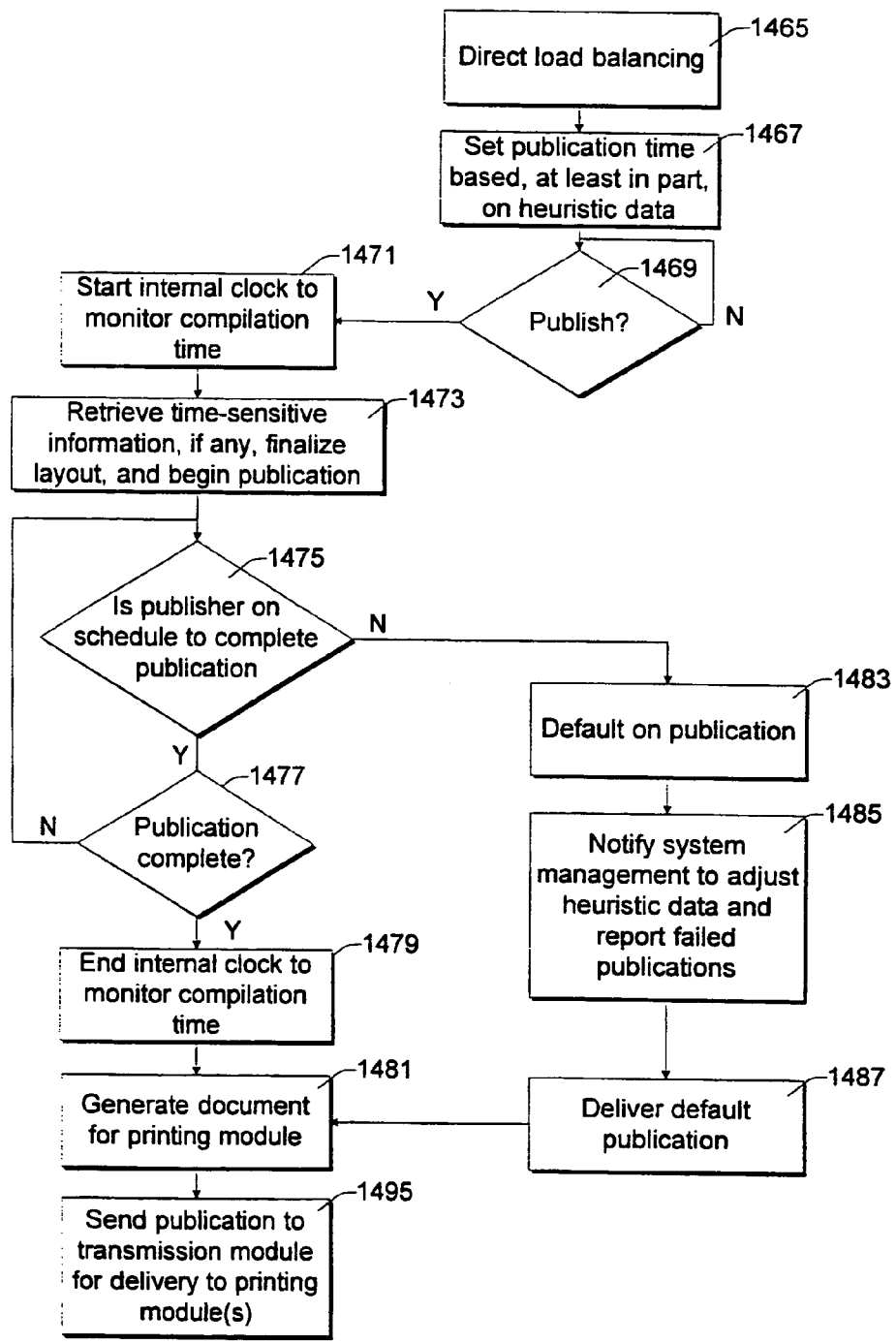
FIG. 20 illustrates a flow chart of an example method for scheduling delivery of custom document(s), according to one aspect of the present invention.

Turning next to FIGS. 19 and 20, the operation of the innovative publishing agent 504 will be described. As introduced above, once construction agent 520 has compiled the components of a personalized publication, the construct is provided to publishing agent 504, block 1445. In block 1447, publishing agent 504 invokes an instance of layout manager 516 and an internal clock (not shown) is engaged to monitor the compilation time associated with at least the partial layout of the publication. According to one implementation, more complex measures are developed and maintained such as, for example, compilation time at a particular time of day, day of the week, etc. By maintaining this measure of compilation time, however complex or rudimentary, enables publishing agent 504 to improve publication and delivery scheduling.

In block 1448, layout manager 516 determines whether the publication contains any time sensitive material. If so, a further determination is made of whether the delivery schedule must include time to obtain information (content objects) immediately prior to delivery of the publication, block 1451. If the publication does not contain time sensitive information (1449), or the delivery schedule does not require obtaining information immediately prior to delivery (1451), layout manager 516 receives the content objects from the virtual editor 506 to finalize the layout of the publication, block 1453. In block 1455, layout manager analyzes the content objects in light of the key contributor information and generates a final layout of the document.

If the publication is to include last minute, time sensitive information (identified in blocks 1449 and 1451, respectively), layout manager 516 receives the content objects from the virtual editor and performs a partial final layout of the publication, leaving layout completion to the schedule manager 514 once the last minute content objects have been retrieved, block 1454.

In block 1457, upon completion of the final or partial-final layout of the publication, layout manager 516 disengages the internal clock, calculates the compilation time and updates a measure of compilation time. According to one implementation, layout manager 516 generates a measure of publication complexity and maintains a measure of estimated compilation time for varying degrees of publication complexity. The estimated compilation time may then be used to optimally schedule publication layout jobs based, at least in part, on the complexity of the jobs.

In block 1459, a layout manager 516 determines whether the publication is a unique document intended for one user, or whether it is to be "broadcast" to multiple recipients. If it is destined for a single user, layout manager forwards it to schedule manager 514. If, it is to be broadcast to multiple recipients, layout manager 516 first tabulates publication quantities in block 1461 before sending the publication to schedule manager 514, block 1460.

FIG. 20 provides a flow chart of an example method for optimally scheduling publication, according to one aspect of the present invention. As shown, the process begins with block 1465, wherein schedule manager 514 receives a publication from layout manager 516 and performs an initial load balancing calculation. According to one implementation, layout manager 516 provides schedule manager 514 with an estimate of compilation time, from which schedule manager 514 schedules publication to optimally utilizes the resources of publishing agent 504. The estimate of compilation time may be a quantitative value (e.g., the compilation time of layout manager 516 to layout the publication), or a qualitative value (e.g., an indication that the publication is of low, medium or high complexity).

According to another implementation, schedule manager 514 identifies the intended recipient (and a related printing device) to determine print status, print media, media count, etc. In one embodiment, this information is retrieved from an printing module 380 associated with the user and/or identified printer. In an alternate embodiment, this information is provided by querying the printing device directly. Using this information, along with the compilation time information, schedule manager 514 can best identify which jobs can be completed in a certain time-frame, and further optimize the publication schedule. Schedule manager 516 then identifies an optimal publication start time based on, for example, the relative complexity of the received publication versus other scheduled publications. According to one embodiment, schedule manager 514 maintains a queue of publication jobs denoting the start time and estimated processing time for each publication.

In block 1469, schedule manager 514 determines whether it is time to complete publication and delivery of a queued publication. If so, schedule manager 514 engages an internal clock to monitor compilation time, block 1471. As above, the measure of compilation time is useful for making future estimates of schedule manager 514 processing time for jobs of similar complexity, thereby iteratively developing a more accurate schedule manager 514.

In block 1473, schedule manager 514 acquires any last minute, time sensitive information for inclusion in the publication, and finalizes the layout of the publication including such content.

In block 1475, schedule manager 514 continuously monitors whether the publisher agent 504 is on schedule to complete the publication within the allocated time. This is particularly important during, for example, publication of multiple quantities of a document. In such an instance, schedule manager continuously determines whether publication of all the documents is likely to occur. Assuming that publisher is currently on schedule, schedule manager 514 further determines in block 1477 whether publication is complete.

Once publication is complete, schedule manager 514 disengages the internal clock measuring compilation time and records this information for use in future publication estimation and scheduling, block 1479. In block 1481, schedule manager 514 generates the document for delivery to printing module 380, and sends the document to transmission module 150 for delivery to the printing modules 380, block 1495.

If, in block 1475, above, schedule manager 514 determines that the publisher is not likely to complete the publication according to schedule, schedule manager 514 defaults on the publication in block 1483, so that it can maintain its publication schedule by moving on to the next publication job. In such an implementation, schedule manager 514 notifies system management to adjust the heuristic data and report the failed publications, block 1485. In block 1487, a default publication is generated and provided to printing module(s) 380, block 1481. In an alternate implementation, rather than defaulting the current publication (1483), schedule manager 514 re-optimizes the publication schedule, shifting publication jobs in the queue as necessary to ensure publication of the current document.

Figure 21:
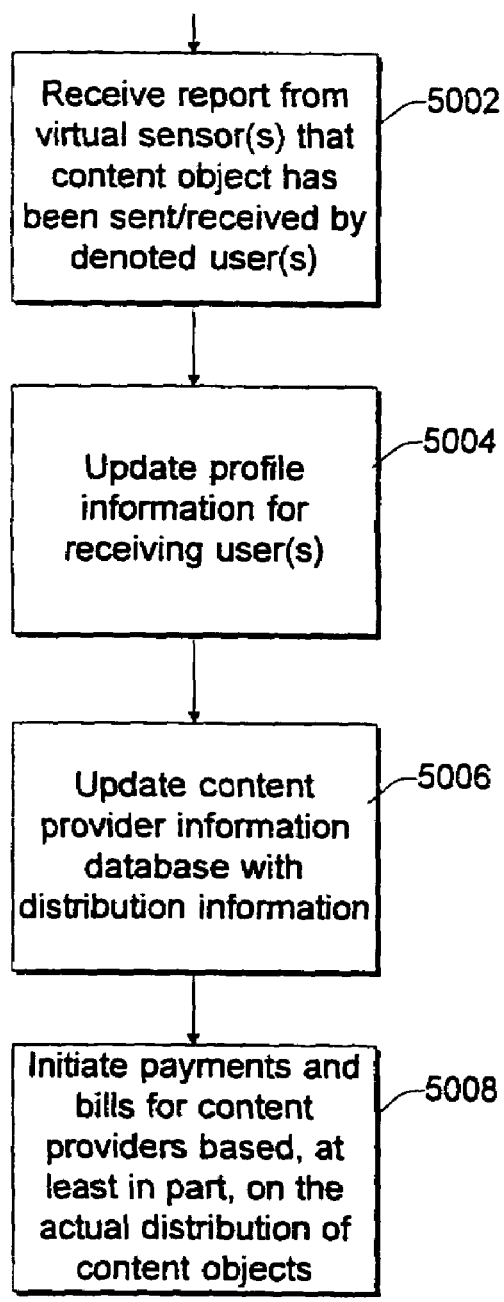
FIG. 21 illustrates a flow chart of an example method for tracking the distribution of content objects and accounting to content providers, in accordance with one aspect of the present invention.

Turning next to FIG. 21, a flow chart of an example method for tracking distribution, receipt and disposition of individual content objects comprising a personalized publication is presented, according to one aspect of the present invention. As introduced above, whenever edit module 120 receives content (artistic or advertising) it categorizes the content objects and encapsulates the object in a trace wrapper. The trace wrappers are uniquely identifiable markers associated with objects in the document delivery system. Virtual sensors embedded throughout the document delivery system (e.g., in printing modules) identify receipt and interaction with objects encapsulated in such wrappers, covertly providing document delivery system with valuable feedback on which objects are of interest to particular users, the amount of distribution of content objects, and the like.

Figure 24:
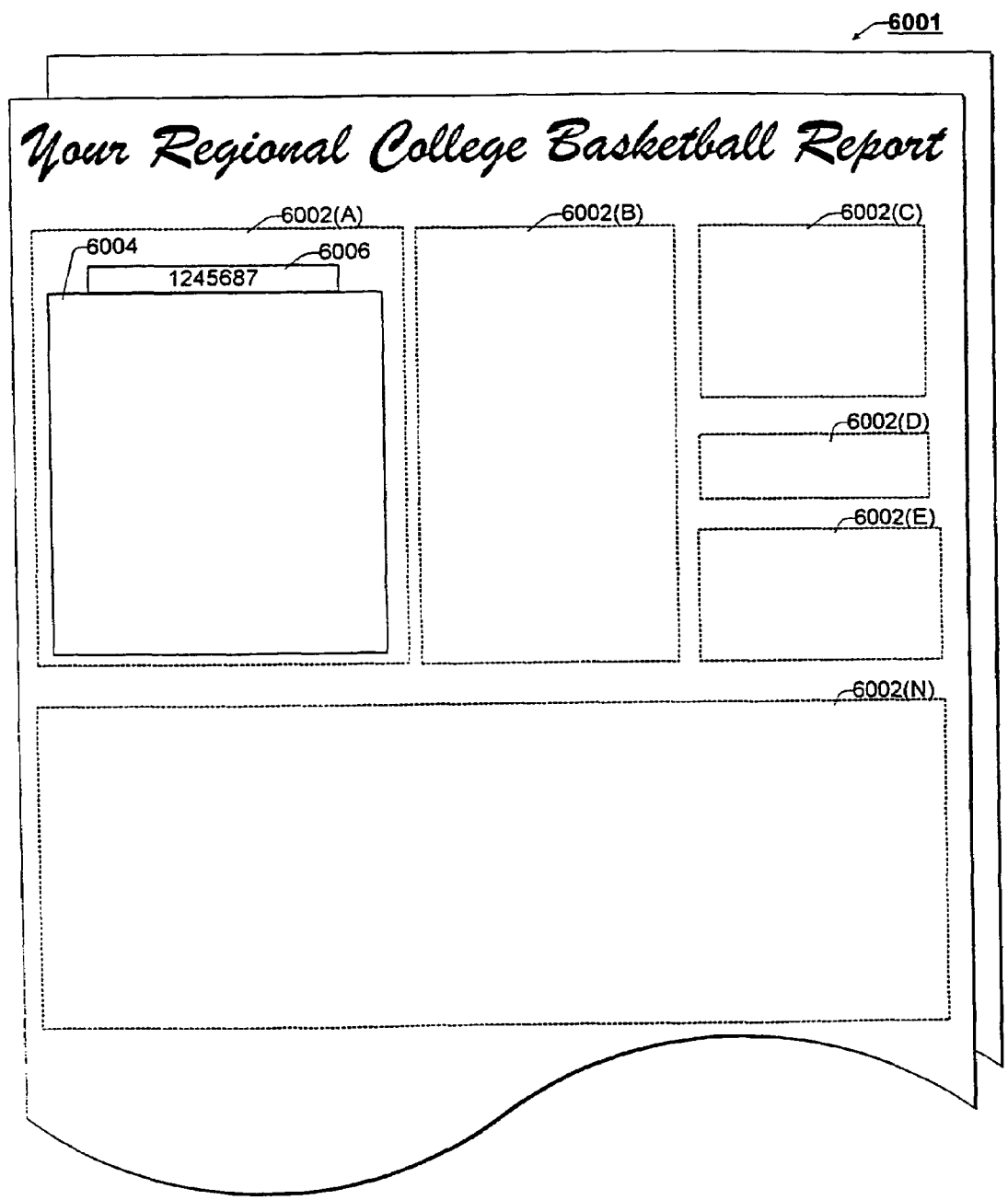
FIG. 24 graphically illustrates an example document comprised of content objects encapsulated in wrappers by the innovative virtual editor, according to one aspect of the present invention.

As used herein, trace wrappers are non-invasive markers, i.e., they do not alter the content of the content objects. For purposes of illustration, and not limitation, an example of a personalized publication 6000 comprised of content objects embedded in trace wrappers 6002(A) . . . (N) is provided with reference to FIG. 24. As shown, content object 6004 is encapsulated within a trace wrapper 6002(A) with a "tag", or "marker" 6006 which is stored in content provider information data structure to uniquely identify the content object.

According to the illustrated example embodiment, the method of FIG. 21 begins with block 5002, wherein the content manager 518 of virtual editor 506 receives an report from one or more virtual sensor(s) that content objects have been sent through, or received by, identified users. In response, appropriate content manager 518 updates appropriate user profile(s) (block 5004) and content provider information data structures (block 5006) to reflect the distribution, receipt and/or disposition of content objects. In block 5008, contract administrator 524 of content manager 518 periodically initiates financial transactions with content providers 50, advertising providers 80 and subscribing users.

More specifically, contract administrator 524 initiates royalty payments for the distribution and receipt of content objects provided by select content providers, in accordance with contractual obligations established between the document delivery system and such content providers. In this regard, contract administrator identifies the usage of content objects associated with the content providers 50 to determine an accurate royalty payment, and instructs transaction agent 526 to complete the financial transaction, preferably via one of a number of electronic financial service networks. In such an instance, transaction agent 526 initiates a payment to the financial service network account associated with the content providers 50 in the amount identified by contract administrator 524. Alternatively, transaction agent 526 may initiate printing of checks payable to the content providers 50 in a denomination indicated by contract administrator 524, wherein such printed checks are then mailed to the content providers 50.

According to one aspect of the invention, the degree of accuracy with which content distribution and disposition is monitored within document delivery system 10 facilitates "micro-transactions", i.e., electronic transactions which occur automatically with each system operation in which a financial obligation is created (as defined in contract administration information). According to one example embodiment, a financial account associated with a content provider 50 is credited with a royalty payment each time a content object associated with the content provider 50 is (re)distributed. This may amount to hundreds, thousands or millions of micro-transactions per day, per content provider. Transaction agent 526 may initiate financial transactions as accrued lump sums transacted on a periodic basis, or based on reaching a monetary threshold (e.g., payments are made in $10 increments). Although described in the context of a royalty payment to a content provider 50, financial transaction agent 526 may alternatively debit accounts of advertising providers 80, or subscribing users on a micro-transaction, periodic or other lump-sum basis in much the same fashion as described above.

Similarly, contract administrator 524 periodically calculates advertising usage for advertising providers 80, instructing transaction agent 526 to bill the identified advertising providers 80 based on advertising usage, placement, associations, and the like. As above, transaction agent 526 preferably carries this billing out via an electronic financial network, but may alternatively (or in addition) initiate the printing and mailing of physical bills to the advertising providers 80.

Turning to FIG. 22, an example method for producing publications utilizing the innovative publishing tool set of edit module 120 is presented, according to one embodiment of the present invention. As introduced above, the innovative publishing tool set 512 enables a user to produce a publication by merely developing a publication profile 640. The document generation facilities of an innovative document server 100, e.g., the publishing agent 504 and the virtual editor 506, utilize the information provided in the publication profile to retrieve content objects appropriate to the topic/genre of the publication and automatically generates a publication on behalf of the producer. It will be appreciated, then, that the innovative publishing tool set 512 in concert with the automated document generation facilities of a document server enables a single producer to generate, market and distribute professional looking publications. As alluded to above, although depicted as a functional element of edit module 120, it should be appreciated that the publishing tool set 512 may well be located outside of document server 100 and, indeed, outside of document delivery system 10, without deviating from the spirit and scope of the present invention.

In accordance with the illustrated example embodiment, the method begins with block 5502 wherein an indication is received to invoke the publishing tool set 512. In block 5504, a user interface (UI) of the publishing tool set 512 is invoked to register and generate/update a publication profile for the requesting producer. As introduced above, the UI enables a producer to generate/update a publication profile 640 which defines the scope, content and schedule of a publication. An example user interface is provided with reference to FIG. 23.

Turning briefly to FIG. 23, an example user interface (UI) suitable for use with publishing tool set 512 is graphically illustrated, according to one embodiment of the present invention. As shown, the UI 6000 requests a producer name and password to register, and also requests information regarding the scope and content of the publication, a publication layout and a publication schedule. This information is received and maintained in a publication profile data structure 640, described above.

Returning to FIG. 22, the automated document generation facilities of document server 100 utilize information store in publication profile(s) to establish publication schedules. In block 5506, a determination of whether an indication to publish has been received, e.g., from the document generation facilities based, at least in part, on the publication profile(s) 640. If such an indication has been received, virtual editor 120 acquires content objects from content providers in accordance with the publication profile 640. According to one embodiment, once virtual editor 120 has retrieved the content objects and constructed the publication in accordance with the layout criteria of the publication profile, the usage requirements of the contract administration information, and other key contributors, publishing agent 504 is invoked to schedule publication and delivery of the constructed document, as described above.

In accordance with the illustrated example embodiment, once virtual editor has retrieved the content objects, an initial publication is created and provided to the producer for editorial input, block 5510. The initial publication, sometimes referred to as an editorial mock-up, is created according to the publication profile layout criteria, contract administration information, content provider usage criteria, key contributor information and the like, for review by the producer. According to one implementation, the editorial mock-up is sent to the producer via an email message, while in alternate implementations, the producer logs into the document server 100 during a pre-defined editorial period during which the producer can manipulate the content/format/layout of the mock-up publication.

In block 5512, document delivery server 100 receives edits from the producer, if any, and makes changes to the publication to reflect the producers editorial input. In block 1445, the document is sent to publishing agent 504 to publish the publication in accordance with the producer's editorial input, and the final publication is created. An example publication created in accordance with a publication profile 640 is illustrated with reference to FIG. 24.

According to one implementation, the created document is published in a publication catalog, wherein users can browse and select publications of interest for download and/or subscription.

What is claimed is:

1. A method comprising:
 receiving information from a producer to generate and/or update a publication profile;
 selecting content objects received from one or more content providers based, at least in part, on the publication profile;
 generating a publication utilizing at least a subset of the selected content objects; and,
 initiating delivery of a product subsidy when a user has printed a predetermined number of publications that include advertising, wherein an advertiser funds delivery of the product subsidy.

2. A method according to claim 1, further comprising:
 posting a finalized publication to a publication catalog for delivery to requesting users accessing the publication catalog.

3. A method according to claim 2, further comprising:
 monitoring distribution of the finalized publication to one or more subscribers; and
 initiating a financial transaction with one or more content providers providing content objects to the finalized publication.

4. A method according to claim 2, further comprising:
 monitoring distribution of the finalized publication to one or more subscribing users; and
 initiating delivery of a subsidy to subscribing users supported by one or more of the content providers based, at least in part, on the monitored distribution of finalized publication.

5. A method according to claim 1, wherein the publication profile identifies one or more of genre information, preferred content providers, whether the producer wants to pre-approve publication, publication templates, and publication schedules.

6. A method according to claim 1, wherein selecting content objects is performed on a periodic basis in accordance with the publication profile.

7. A storage medium comprising a plurality of executable instructions including a subset of which that, when executed, implement a method according to claim 1.

8. A document delivery system comprising:
 a data store to maintain a plurality of content objects received from a plurality of content providers;
 a virtual editor, coupled to the data store, to dynamically select one or more content objects for use in a personalized publication based, at least in part, on a publication profile, and
 a distribution module that provides a product subsidy to a user, wherein an advertiser funds delivery of the product subsidy.

9. A document delivery system according to claim 8, wherein the virtual editor generates an initial publication using the dynamically selected content objects.

10. A document delivery system according to claim 9, wherein the initial publication is generated in accordance with a publication format denoted in the publication profile.

11. A document delivery system according to claim 9, wherein the virtual editor provides a communicatively coupled producer with the initial publication for editorial purposes.

12. A document delivery system according to claim 11, wherein the virtual editor provides the communicatively coupled producer with the initial publication via one or more of an email message, file transfer protocol download, webpage download.

13. A document delivery system according to claim 11, wherein the communicatively coupled producer is a software agent executing on a remote system.

14. A document delivery system according to claim 11, wherein the virtual editor receives editorial modifications to the initial publication from the communicatively coupled producer and generates a finalized publication.

15. A document delivery system according to claim 14, wherein the virtual editor distributes the finalized publication to one or more subscribing users.

16. A document delivery system according to claim 15, wherein the virtual editor monitors distribution of the finalized publication and initiates a financial transaction with one or more content providers based, at least in part, on the distribution of the finalized publication.

17. A document delivery system according to claim 14, wherein the virtual editor promotes the finalized publication to a publication catalog for selection and distribution to requesting users.

18. A document delivery system according to claim 17, wherein the virtual editor monitors distribution of the finalized publication and initiates a financial transaction with one or more content providers based, at least in part, on the distribution of the finalized publication.

19. A document delivery system according to claim 17, wherein the publication catalog includes a plurality of publications available to requesting users.

20. A document delivery system according to claim 17, wherein the virtual editor generates the finalized publication from the initial publication based, at least in part, on editorial modifications to the initial publication by the communicatively coupled producer.

21. A storage medium comprising a plurality of executable instructions including at least a subset of which, when executed, implements an automated publication service including a registration function, to register a producer and generate and/or update a created publication profile, and a dynamic editor function to dynamically select content objects for generation of a personalized publication based, at least in part, on the publication profile, and a distribution function that distributes a product subsidy to a user, wherein an advertiser funds delivery of the product subsidy.

22. A storage medium according to claim 21, wherein the editor function generates an initial publication based on dynamically selected content objects, and to provide the initial publication to a producer for editorial modification.

23. A storage medium according to claim 22, wherein the editor function generates a finalized publication from the initial publication reflecting received editorial modification(s).

24. A storage medium according to claim 21, wherein the editor function distributes finalized publications to requesting users.

25. A storage medium according to claim 24, wherein the editor function monitors distribution of finalized publications to requesting users.

26. A storage medium according to claim 25, wherein the editor function initiates financial transactions with one or more content providers based, at least in part, on the monitored distribution of finalized publications.

27. A storage medium according to claim 25, wherein the editor function initiates delivery of a subsidy to users requesting publications based, at least in part, on the monitored distribution of finalized publications.

28. A storage medium according to claim 21, wherein the publication profile includes one or more of a publication genre, a publication scope, selection of one or more content providers, and/or a publication schedule.

* * * * *